US009089993B2

(12) United States Patent
Yoshioka et al.

(10) Patent No.: US 9,089,993 B2
(45) Date of Patent: Jul. 28, 2015

(54) CERAMIC GREEN SHEET, CERAMIC GREEN SHEET LAMINATE, PRODUCTION METHOD OF CERAMIC GREEN SHEET, AND PRODUCTION METHOD OF CERAMIC GREEN SHEET LAMINATE

(75) Inventors: Kunihiko Yoshioka, Nagoya (JP); Koji Kimura, Nagoya (JP); Satoshi Ishibashi, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 367 days.

(21) Appl. No.: 13/438,307

(22) Filed: Apr. 3, 2012

(65) Prior Publication Data

US 2012/0186736 A1 Jul. 26, 2012

Related U.S. Application Data

(62) Division of application No. 12/392,363, filed on Feb. 25, 2009, now Pat. No. 8,178,192.

(30) Foreign Application Priority Data

Mar. 6, 2008 (JP) .................................. 2008-055729
Sep. 16, 2008 (JP) .................................. 2008-235882

(51) Int. Cl.
*C03B 29/00* (2006.01)
*B28B 13/02* (2006.01)
(Continued)

(52) U.S. Cl.
CPC .............. *B28B 13/021* (2013.01); *B28B 1/008* (2013.01); *B28B 7/0091* (2013.01);
(Continued)

(58) Field of Classification Search
CPC ......... H05K 3/10; H05K 3/101; H05K 3/103; H05K 3/107; H05K 3/207; B29C 45/02; B29C 45/14; B29C 45/14008; B29C 45/1418; B29C 2045/14237; B29C 2045/14245; B29C 2045/1454; B29C 45/1615; B29C 45/1657; B29C 45/0062; B29C 45/03; B29C 45/04; B28B 1/0008; B28B 19/0015; B28B 1/14; B28B 1/16; B28B 1/24; C04B 35/00; C04B 27/001; C04B 2237/32; B32B 3/10; B32B 18/00; B32B 3/14

USPC .................. 156/230, 232, 242, 245; 264/259, 264/271.1, 272.11, 272.13, 272.14, 272.15, 264/275, 279, 279.1, 272.12

See application file for complete search history.

(56) References Cited

U.S. PATENT DOCUMENTS 3,085,295 A * 4/1963 Pizzino et al. ................. 264/255
3,978,248 A 8/1976 Usami
(Continued)

FOREIGN PATENT DOCUMENTS

EP 2 028 688 2/2009
GB 2 212 333 7/1989
(Continued)

OTHER PUBLICATIONS

Japanese Office Action, Japanese Application No. 2010-501969, dated Dec. 17, 2013 (3 pages).
(Continued)

*Primary Examiner* — Alex Efta
(74) *Attorney, Agent, or Firm* — Burr & Brown, PLLC

(57) ABSTRACT

The present invention provides a ceramic green sheet with a thin flat plate shape obtained by molding and solidifying a ceramic slurry, which contains a ceramic powder, dispersion medium, and gelling agent, into a thin flat plate. The ceramic green sheet partially includes a body that is obtained by molding and solidifying a conductor paste, which becomes a conductor later, and the body is exposed on a part of each of the both surfaces of the sheet. Plural ceramic green sheets described above are produced. The plural ceramic green sheets are successively stacked and press-bonded in the thickness direction in such a manner that the bodies included in the respective sheets are connected to each other for all combinations of the adjacent two sheets. As a result, a ceramic green sheet laminate is formed, which includes one body that is obtained by connecting the bodies included in the respective sheets.

13 Claims, 18 Drawing Sheets

(51) Int. Cl.
| | | |
|---|---|---|
| *B28B 1/00* | (2006.01) | |
| *B28B 7/00* | (2006.01) | |
| *B28B 19/00* | (2006.01) | |
| *B32B 18/00* | (2006.01) | |
| *H01G 4/12* | (2006.01) | |
| *B29K 309/02* | (2006.01) | |
| *B29C 45/03* | (2006.01) | |
| *B29C 45/04* | (2006.01) | |
| *B29C 45/14* | (2006.01) | |
| *B28B 1/14* | (2006.01) | |
| *B28B 1/16* | (2006.01) | |
| *B28B 1/24* | (2006.01) | |
| *C04B 35/00* | (2006.01) | |
| *C04B 37/00* | (2006.01) | |
| *B32B 3/10* | (2006.01) | |
| *B32B 3/14* | (2006.01) | |

(52) U.S. Cl.
CPC .......... *B28B 19/0015* (2013.01); *B32B 18/00* (2013.01); *H01G 4/12* (2013.01); *B28B 1/14* (2013.01); *B28B 1/16* (2013.01); *B28B 1/24* (2013.01); *B29C 45/03* (2013.01); *B29C 45/04* (2013.01); *B29C 45/14* (2013.01); *B29C 45/14008* (2013.01); *B29K 2309/02* (2013.01); *B32B 3/10* (2013.01); *B32B 3/14* (2013.01); *C04B 35/00* (2013.01); *C04B 37/001* (2013.01); *C04B 2235/602* (2013.01); *C04B 2237/32* (2013.01); *C04B 2237/34* (2013.01); *C04B 2237/341* (2013.01); *C04B 2237/343* (2013.01); *C04B 2237/346* (2013.01); *C04B 2237/348* (2013.01); *C04B 2237/365* (2013.01); *C04B 2237/368* (2013.01); *C04B 2237/68* (2013.01); *Y10T 428/24926* (2015.01)

(56) References Cited

U.S. PATENT DOCUMENTS

| | | | |
|---|---|---|---|
| 4,788,046 A | 11/1988 | Barringer et al. | |
| 4,959,330 A | 9/1990 | Donohue et al. | |
| 5,004,640 A | 4/1991 | Nakatani et al. | |
| 5,011,732 A | 4/1991 | Takeuchi et al. | |
| 5,165,986 A | 11/1992 | Gardner et al. | |
| 5,240,671 A | 8/1993 | Carey | |
| 5,354,599 A | 10/1994 | McClanahan et al. | |
| 5,449,480 A * | 9/1995 | Kuriya et al. | 264/112 |
| 5,500,278 A | 3/1996 | Nagasaka | |
| 5,612,121 A | 3/1997 | Tani et al. | |
| 5,965,245 A * | 10/1999 | Okano et al. | 428/209 |
| 6,086,793 A | 7/2000 | Tani et al. | |
| 6,136,734 A | 10/2000 | Jean et al. | |
| 6,174,829 B1 | 1/2001 | Jean et al. | |
| 6,238,779 B1 | 5/2001 | Iwao et al. | |
| 6,531,257 B2 | 3/2003 | Kubota | |
| 6,596,382 B2 | 7/2003 | Kawakami | |
| 6,599,463 B2 | 7/2003 | Miyazaki et al. | |
| 6,808,577 B2 | 10/2004 | Miyazaki et al. | |
| 6,885,276 B2 | 4/2005 | Iha et al. | |
| 7,087,293 B2 | 8/2006 | Cho et al. | |
| 7,618,474 B2 | 11/2009 | Akimoto et al. | |
| 7,638,010 B2 | 12/2009 | Tokuoka et al. | |
| 8,033,819 B2 | 10/2011 | Ohashi et al. | |
| 2001/0006451 A1 | 7/2001 | Miyazaki et al. | |
| 2001/0010617 A1 | 8/2001 | Miyazaki et al. | |
| 2003/0232221 A1* | 12/2003 | Yamada et al. | 428/697 |
| 2005/0212185 A1 | 9/2005 | Miyazawa | |
| 2009/0035538 A1* | 2/2009 | Namerikawa et al. | 428/201 |

FOREIGN PATENT DOCUMENTS

| | | | |
|---|---|---|---|
| GB | 2212333 A * | 7/1989 | |
| JP | 62-092396 A1 | 4/1987 | |
| JP | 62-092396 AI | 4/1987 | |
| JP | 05-110258 A1 | 4/1993 | |
| JP | 10-107439 A1 | 4/1998 | |
| JP | 2001-176751 | 6/2001 | |
| JP | 2001-232617 A | 8/2001 | |
| JP | 2001-237140 A | 8/2001 | |
| JP | 2004-136647 A1 | 5/2004 | |
| JP | 2005-001279 A1 | 1/2005 | |
| JP | 2006-303055 A1 | 11/2006 | |
| WO | 2004/035281 A1 | 4/2004 | |

OTHER PUBLICATIONS

Japanese Office Action, Japanese Application No. 2010-501969, dated May 13, 2014 (2 pages).
Extended European Search Report dated Mar. 13, 2012.
European Search Report, European Application No. 09 717 063.3, dated Feb. 11, 2014 (4 pages).
International Search Report dated Apr. 21, 2009 for PCT/JP2009/054238.
Extended European Search Report dated Mar. 13, 2012 for EP 09 71 7063.

* cited by examiner (a)  (b)

(a)  (b)

FIG. 11
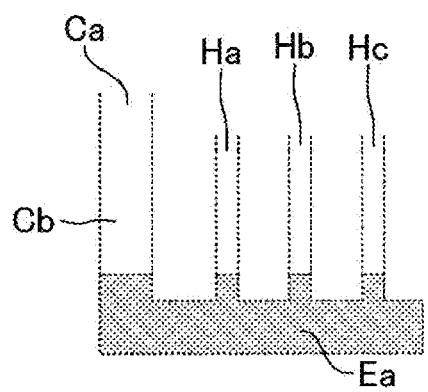
(a)
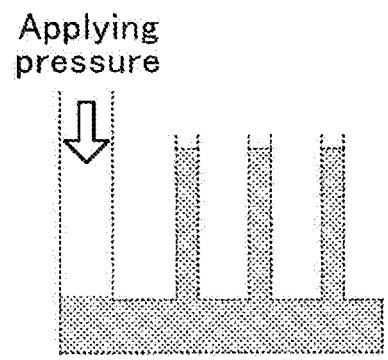
(b)
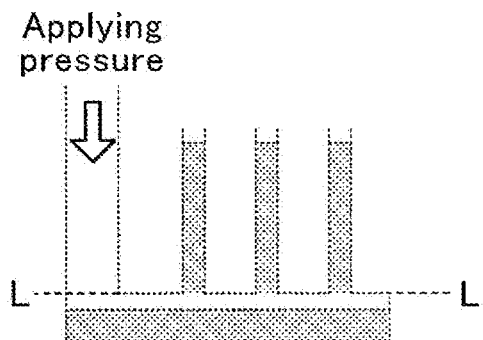
(c)
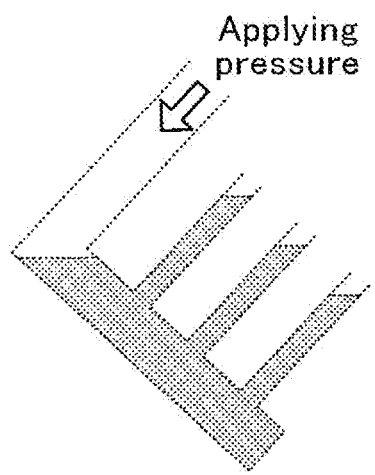
(d)

(a)     (b)

FIG. 19
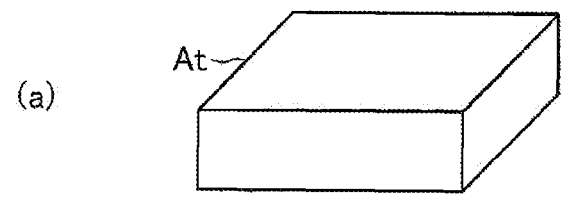
(a)
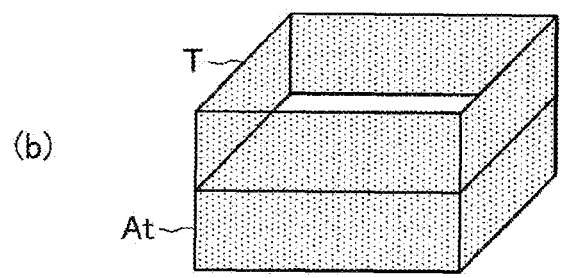
(b)
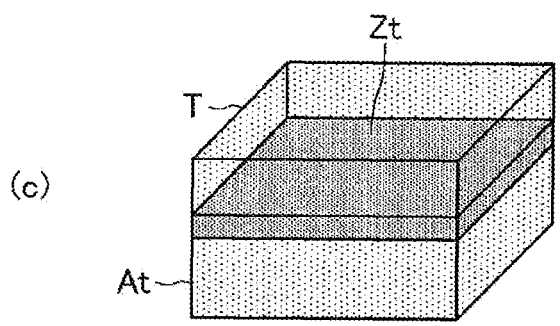
(c)
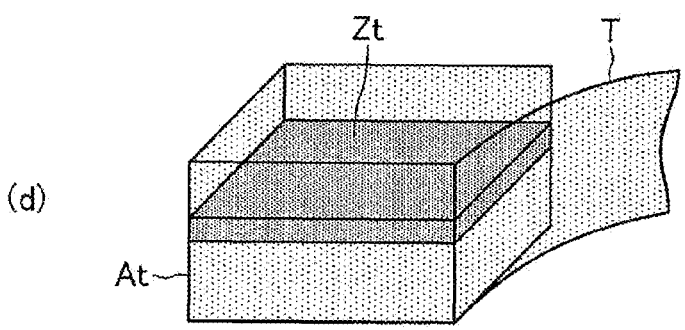
(d)
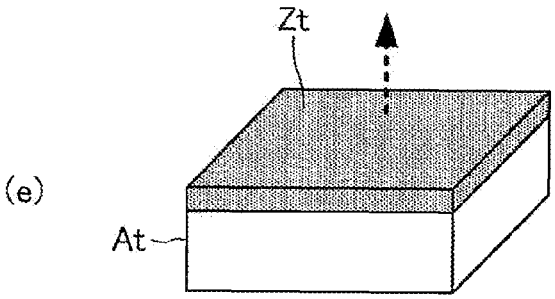
(e)

FIG. 20
(a)
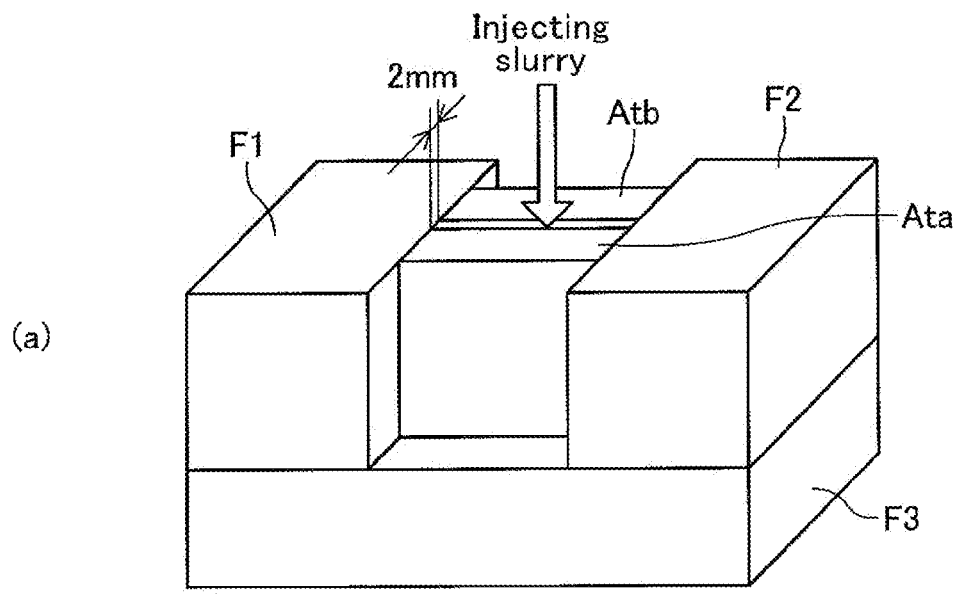
(b)
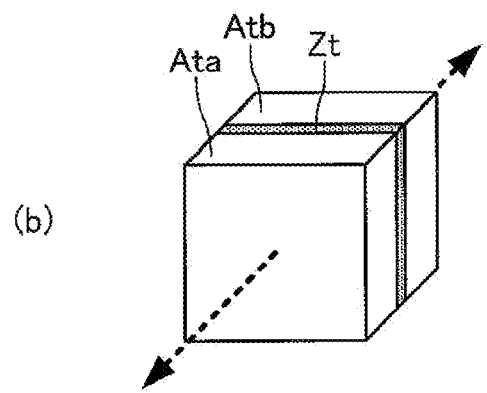
(c)
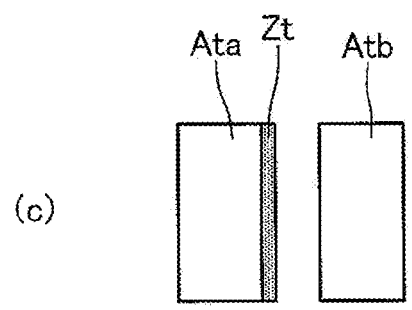

CERAMIC GREEN SHEET, CERAMIC GREEN SHEET LAMINATE, PRODUCTION METHOD OF CERAMIC GREEN SHEET, AND PRODUCTION METHOD OF CERAMIC GREEN SHEET LAMINATE

CROSS REFERENCE TO RELATED APPLICATIONS

This application is a division of U.S. application Ser. No. 12/392,363, filed Feb. 25, 2009, now U.S. Pat. No. 8,178,192, and claims the benefit under 35 USC §119(a)-(d) of Japanese Patent Application No. 2008-055729, filed Mar. 6, 2008, and Japanese Patent Application No. 2008-235882, filed Sep. 16, 2008, the entireties of which are incorporated herein by reference.

FIELD OF THE INVENTION

The present invention relates to a ceramic green sheet, a ceramic green sheet laminate, a production method of a ceramic green sheet, and a production method of a ceramic green sheet laminate.

BACKGROUND OF THE INVENTION

As one of production methods of a ceramic green body that is the state before a ceramic body is fired, there has conventionally been proposed a method of producing a ceramic green body. In this method, a ceramic slurry containing a ceramic powder, a dispersion medium, and a gelling agent is subject to molding in a mold, and the resulted molded ceramic slurry is solidified (gelated) to form a ceramic green body (see, for example, WO 2004/032581). This method is referred to as a gelcasting process.

SUMMARY OF THE INVENTION

In recent years, there has been proposed a technique for forming a ceramic green sheet laminate serving as the ceramic green body. In this technique, a flat-plate ceramic green sheet is formed with the gelcasting process, and two or more ceramic green sheets are stacked in the thickness direction so as to form the ceramic green sheet laminate.

The present inventors have found that, when the technique described above is employed, a conductor (electronic components such as coil, inductor, coupler, antenna, etc.) having a complicated three-dimensional shape, and a space (cavity) can easily be formed by containing a body, which is made of a precursor of the conductor, during the process of forming each of the ceramic green sheets.

The ceramic green sheet according to the present invention has a flat-plate structure having a uniform thickness that is obtained by molding and solidifying a ceramic slurry, which contains a ceramic powder, dispersing medium, and gelling agent, into a flat-plate shape. The ceramic green sheet is characterized by partially including a body that is obtained by molding and solidifying a paste, which is made of a component different from the component of the ceramic slurry, wherein the body is exposed on a part of each of both surfaces of the ceramic green sheet. For example, the ceramic slurry contains a component that is solidified through gelation by a urethane reaction.

The body is composed of, for example, a precursor of the conductor. The precursor becomes the conductor when the ceramic sheet is formed through the firing of the ceramic green sheet. The body may also be composed of a component (e.g., resin component, or the like, and referred to as "removed components through volatilization" below) that is totally removed through the volatilization when the ceramic sheet is formed by firing the ceramic green sheet. The body may also be composed of a precursor of the ceramic, which precursor becomes the ceramic when the ceramic sheet is formed by firing the ceramic green sheet.

In the body, the portion that is exposed on a part of one of both surfaces of the ceramic green sheet and the portion that is exposed on a part of the other one of both surfaces of the ceramic green sheet are not connected to each other. In this case, when the body is composed of the precursor of the conductor, a condenser having the ceramic interposed between the conductors that are arranged so as to be apart from each other by a predetermined distance can be formed during the process of forming the ceramic sheet through the firing of the ceramic green sheet.

In the body, the portion that is exposed on a part of one of both surfaces of the ceramic green sheet and the portion that is exposed on a part of the other one of both surfaces of the ceramic green sheet may be connected to each other. In this case, it is preferable that, for some or all combinations of the adjacent two ceramic green sheets in the ceramic green sheet laminate having two or more ceramic green sheets laminated in the thickness direction, the portion of the body that is contained in one of the two adjacent ceramic green sheets and exposed to the side facing the other of the two adjacent ceramic green sheets and the portion of the body that is contained in the other of the two adjacent ceramic green sheets and exposed to the side facing the one of the two adjacent ceramic green sheets are connected to each other.

By virtue of this structure, when the body is composed of the precursor of the conductor, for example, an electronic component (e.g., coil, inductor, coupler, antenna, etc.) having continuous complicated three-dimensional shape can be formed when the ceramic sheet is formed through the firing of the ceramic green sheets. Alternatively, when the body is made of the "removed components through volatilization", for example, a space (cavity) having continuous complicated three-dimensional shape can be formed when the ceramic sheet is formed through the firing of the ceramic green sheets.

The ceramic green sheet according to the present invention is produced as described below, for example. Firstly, a paste is molded and solidified on a plane of a first molding die having the plane so as to form a body having a predetermined shape. Then, the first molding die and a second molding die having a plane are arranged such that the plane of the first molding die on which the body is formed and the plane of the second molding die face each other in parallel with each other with a gap, and the top surface of the body is brought into contact with the plane of the second molding die. Next, a ceramic slurry, which contains a ceramic powder, dispersion medium, and gelling agent and is made of a component different from the paste, is filled in the space formed between the planes of the first and second molding dies, in order to mold the ceramic slurry into a thin flat plate. Then, the molded ceramic slurry is solidified (thereafter, the first and second molding dies are removed).

By virtue of this process, the ceramic green sheet having a thin flat plate shape and having uniform thickness according to the present invention (i.e., the ceramic green sheet partially including the body having the predetermined shape, wherein the body is exposed on a part of each of both surfaces of the ceramic green sheet) can be obtained. In this case, the portion of the body that is exposed on a part of one of both surfaces of the ceramic green sheet and the portion of the body that is exposed on a part of the other surface of the ceramic green sheet are connected to each other.

In the process described above, the ceramic slurry is molded into a thin flat plate with the body being formed on only the first molding die of the first and second molding dies. On the other hand, the ceramic slurry may be molded into a thin flat plate with the body being formed on both the first and molding dies.

In this case, the ceramic green sheet is produced as described below, for example. Firstly, a first paste is molded and solidified on a plane of a first molding die having the plane so as to form a first body having a first shape. Then, a second paste is molded and solidified on a plane of a second molding die having the plane so as to form a second body having a second shape. Next, the first molding die and the second molding die are arranged such that the plane of the first molding die on which the first body is formed and the plane of the second molding die on which the second body is formed face each other in parallel with each other with a gap. Next, a ceramic slurry, which contains a ceramic powder, dispersion medium, and gelling agent and is made of a component different from the first and the second pastes, is filled in the space formed between the planes of the first and second molding dies, in order to mold the ceramic slurry into a thin flat plate. Then, the molded ceramic slurry is solidified (thereafter, the first and second molding dies are removed).

According to this process, the ceramic green sheet having a thin flat plate shape and having uniform thickness according to the present invention (i.e., the ceramic green sheet partially including the body having the predetermined shape, wherein the body is exposed on a part of each of both surfaces of the ceramic green sheet) can be obtained.

In this case, when the first and the second molding dies are arranged so as to be opposite to each other in parallel in such a manner that the top surfaces of the first and the second bodies are brought into contact with each other, the portion of the body exposed to a part of one of both surfaces of the ceramic green sheet and the portion of the body exposed on a part of the other surface of the ceramic green sheet are connected to each other. On the other hand, when the first and the second molding dies are arranged so as to be opposite to each other in parallel in such a manner that the top surfaces of the first and the second bodies are apart from each other, the portion of the body exposed to a part of one of both surfaces of the ceramic green sheet and the portion of the body exposed on a part of the other surface of the ceramic green sheet are not connected to each other.

The ceramic green sheet laminate according to the present invention is produced as described below, for example. Firstly, only the second molding die is removed from the respective two or more ceramic green sheets, which are formed by the production process described above and have the first and the second molding dies adhered thereon. Subsequently, the planes of two ceramic green sheets, which are exposed since the second molding dies are removed, are press-bonded to form a ceramic green sheet laminate having two ceramic green sheets described above. Then, only one of two first molding dies adhered on both ends of the ceramic green sheet laminate in the thickness direction is removed. Thus, the ceramic green sheet laminate in which the number of the laminated layers is 2 can be obtained (by removing the remaining one first molding die afterward).

Alternatively, (in the ceramic green sheet laminate having the remaining one first molding die adhered thereon, wherein the number of the laminated layer is 2), the plane of the ceramic green sheet laminate that is exposed since the first molding die is removed and the plane, which is exposed since the second molding die is removed, of the remaining ceramic sheet that has not yet been laminated are press-bonded to form a new ceramic green sheet laminate in which the number of the laminated layers is increased only by 1. Further, the only one of two first molding dies adhered on both ends of the new ceramic green sheet in the thickness direction is removed. This procedure is repeated more than once. Thus, the ceramic green sheet in which the number of the laminated layers is 3 or more can be obtained (by removing the remaining one first molding die afterward).

In this manner, the ceramic green sheet having the first molding die adhered thereon is successively stacked. Thus, the ceramic green sheets are successively stacked only by holding the first molding die, not holding the ceramic green sheet itself. As a result, the ceramic green sheet is easy to handle, and further, the deformation or the like of the ceramic green sheet, which can be generated due to the direct holding of the ceramic green sheet, can be prevented.

In the production process of the ceramic green sheet laminate according to the present invention, it is preferable that the force in the thickness direction needed to separate the press-bonded ceramic green sheets is greater than the force in the thickness direction needed to separate the first molding die, which is adhered onto the ceramic green sheet, from the ceramic green sheet, and the force in the thickness direction needed to separate the first molding die, which is adhered onto the ceramic green sheet, from the ceramic green sheet is greater than the force in the thickness direction needed to separate the second molding die, which is adhered onto the ceramic green sheet, from the ceramic green sheet.

By virtue of this structure, it can be prevented that the first molding die, not the second molding die, is removed in the process of removing only the second molding die from each of the ceramic green sheets having the first and second molding dies adhered thereon. Additionally, it can be prevented that the first molding die is not removed but the press-bonded ceramic green sheets are separated from each other in the process of removing the first molding die from the ceramic green sheet laminate that is obtained by press-bonding the ceramic green sheets.

The force in the thickness direction needed to separate (release) the ceramic green sheet molded on the plane (molding surface) of the molding die from the molding surface is referred to as a "mold release force". The magnitude relation between the mold release force involved with the first molding die and the mold release force involved with the second molding die can be adjusted by performing a surface treatment to the plane of the first molding die and/or the plane of the second molding die, or by applying a mold release agent onto the plane of the first molding die and/or the plane of the second molding die. In this case, a fluorine resin or wax is preferably used as the mold release agent. A fluorine resin coating is preferably performed as the surface treatment. The fluorine resin coating may be directly performed on the plane of the die or may be performed with a predetermined undercoating, plating, and alumite treatment on the plane.

More specifically, a film is formed beforehand through the application of the mold release agent or the surface treatment on the plane of each of the first and second molding dies before the body is formed on the plane of the first molding die or before the first and the second bodies are formed on the planes of the first and the second molding dies. By virtue of this process, the magnitude relation between the mold release force involved with the first molding die and the mold release force involved with the second molding die can be adjusted by making the types of the films different.

For example, when the fluorine resin is used as the mold release agent, the ceramic green sheet can be released (the ceramic green sheet is releasable) by boundary separation with very small mold release force at even room temperature (without damaging the ceramic green sheet. When the wax is used as the mold release agent, the ceramic green sheet can be released by heating and melting the wax, or by damaging the wax itself at room temperature. Therefore, the mold release force is great at room temperature. When the nickel plating containing a fluorine resin is used as the surface treatment (coating), the ceramic green sheet can be released, but the mold release force is great.

In general, the relationship of "mold release force in the case of the wax">"the mold release force in the case of the nickel plating containing a fluorine resin">"mole release force in the case of the fluorine resin" is established at room temperature. When the type of the film, formed on the respective planes of the first and second molding dies according to the application of the mold release agent or the surface treatment, is made different, the magnitude relation between the mold release force involved with the first molding die and the mold release force involved with the second molding die can be adjusted (even if the thickness of the film is the same).

The magnitude relation between the mold release force involved with the first molding die and the mold release force involved with the second molding die can also be adjusted by making the methods of applying the mold release agent different. The mold release agent is applied in order to form the films.

Examples of the method of applying the mold release agent include a spraying method, dipping method, brush coating method, etc. The portion where the surface of the base of the molding die is exposed on the plane of the molding die on which the film is formed is referred to as a "base exposed portion". On the base exposed portion, the base of the molding die and the ceramic green sheet are in direct contact with each other. This acts in the direction of increasing the mold release force. Specifically, the greater the total area of the base exposed portion is, the more the mold release force increases. The liquid obtained by dissolving the mold release agent (solid) into a solvent (organic solvent or the like), which is used for applying the mold release agent, is referred to as "mold-release-agent solution", and the concentration of the mold release agent in the mold-release-agent solution is merely referred to as "concentration of the mold release agent".

The spraying method and the dipping method are compared. In general, an ultrathin film having relatively a uniform thickness can be formed according to the dipping method. On the other hand, the thickness of the film becomes non-uniform according to the spraying method, compared to the case of the dipping method. This is based upon the reason described below. Specifically, the state of the film formed by applying the mold release agent with the spraying method is relatively sensitive to the concentration of the mold release agent, opening degree of a valve portion for adjusting the discharge rate (flow rate of the discharged spray), temperature of the molding die, etc. When the applied mold-release-agent solution is difficult to be dried, such as when the temperature of the molding die is low or when the amount of the discharge liquid is great, the flow (dripping) or aggregation of the mold-release-agent solution is generated. Accordingly, the irregularities are easy to generate on the surface of the formed film. On the contrary, when the applied mold-release-agent solution is easy to be dried, such as when the temperature of the molding die is high or when the amount of the discharge liquid is small, the solvent is volatilized before the level of the mold-release-agent solution is leveled (smoothed). Therefore, the irregularities are also easy to generate on the surface of the formed film. Anyway, the irregularities are easy to generate on the surface of the film, and hence, the thickness of the film is non-uniform in the case of the spraying method, compared to the dipping method. This means that the surface area of the film is increased in the spraying method compared to the dipping method. By virtue of this, the mold release force is increased more in the spraying method than in the dipping method.

Additionally, since the ultrathin film having relatively a uniform thickness can be formed in the dipping method as described above, the "base exposed portion" can be formed on only a great number of microscopic protrusion portions on the plane that correspond to the surface roughness of the plane (molding surface) of the molding die. In other words, only a great number of microscopic "base exposed portions" are dispersed, while relatively large "base exposed portions" are difficult to be formed. On the other hand, the thickness of the film becomes non-uniform in the spraying method as described above. Therefore, when the ultrathin film is formed, the relatively large "base exposed portions" are likely to be formed, compared to the dipping method. Specifically, the total area of the "base exposed portions" is likely to be increased. This causes the mold release force to increase more in the spraying method than in the dipping method. When the area of the individual base exposed portion is too great, the mold release force becomes excessive. As a result, the ceramic sheet is broken (the ceramic green sheet is non-releasable) when the ceramic green sheet is released from the molding die.

As described above, the method of applying the mold release agent in order to form the film is made different, whereby the magnitude relation between the mold release force involved with the first molding die and the mold release force involved with the second molding die can be adjusted (even if the type of the film and the average thickness are the same).

The magnitude relation between the mold release force involved with the first molding die and the mold release force involved with the second molding die can be adjusted by making the thickness of the films different, when the film is applied through the application of the mold release agent. When the thickness of the film is adjusted, the dipping method is preferable as the method of applying the mold release agent. This is based upon the operation in which the ultrathin film having relatively uniform thickness can be formed by the dipping method, and the thickness of the film is easily adjusted, as described above.

When the ultrathin film is formed by the dipping method, the area of the above-mentioned respective "base exposed portions" formed on "a great number of microscopic protrusion portions formed on the molding surface corresponding to the surface roughness of the molding die" is more reduced, as the thickness of the film is increased. As a result, the total area of the "base exposed portions" is further reduced, so that the mold release force is more reduced. Therefore, the magnitude relation between the mold release force involved with the first molding die and the mold release force involved with the second molding die can also be adjusted by making the thickness of the film different (even if the type of the film and the method of applying the mold release agent are the same).

In case where the magnitude relation between the mold release force involved with the first molding die and the mold release force involved with the second molding die can be adjusted by making the thickness of the film, formed through the application of the mold release agent, different, the thickness of the film preferably falls within the range by which the relationship of "0.05·Rc≤t≤0.25·Rc" is established, when the surface roughness of the plane of the first and the second molding dies is defined as Rc (μm) by the average height, and the thickness of the film is defined as t (μm).

When the thickness of the film is too small, the total area of the base exposed portion is too great (the mold release force is too great), so that the ceramic green sheet is damaged when the ceramic green sheet is released (the ceramic green sheet is non-releasable). On the other hand, when the thickness of the film is too great, the base exposed portion is eliminated, so that the total area of the base exposed portion cannot be adjusted. Specifically, even if the thickness of the film is changed, the mold release force becomes fixed to be the minimum, so that the mold release force cannot be adjusted.

On the other hand, when the thickness of the film falls within the range by which the relationship of "0.05·Rc≤t≤0.25·Rc" is established, it has been found that the ceramic green sheet can be released without damaging the ceramic green sheet (the ceramic green sheet is releasable), and the mold release force can be adjusted by changing the thickness of the film as described later.

In the ceramic green sheet laminate, it is supposed that the portion, exposed on one of the surfaces of one ceramic green sheet of two adjacent ceramic green sheets, of the body contained in the ceramic green sheet and the portion, exposed on one of the surfaces of the other ceramic green sheet that is opposite to the surface of the one ceramic green sheet, of the body contained in the other ceramic green sheet, are connected to each other. In this case, a concave portion is formed on the portion corresponding to the body on the plane, on which the body is formed, of one or both of the first and the second molding dies. The portion of the body corresponding to the concave portion is molded into a convex shape projecting from the plane of the ceramic green sheet. When the plane of the ceramic green sheet including the convex shape and the plane of the adjacent ceramic green sheet are press-bonded, it is preferable that the convex portion is pressed and crushed by the portion on the plane of the adjacent ceramic green sheet where the body, included in the adjacent ceramic green sheet, is exposed.

By virtue of this, the bodies included in the adjacent two ceramic green sheets are more surely be connected, compared to the case in which the portion corresponding to the convex shape on the body is molded into a plane shape that is continuous with the plane of the ceramic green sheet without having irregularities. As a result, the continuity of the shape can more surely be secured in an electronic component (e.g., coil, inductor, coupler, antenna, etc.) having the above-mentioned continuous complicated three-dimensional shape or the space (cavity) having the above-mentioned continuous complicated three-dimensional shape.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 11 shows how a ceramic slurry is injected by means of the molding device shown in FIGS. 9 and 10;

FIG. 19 is a view showing the procedure of the experiment performed to determine the "relationship between Rc and t" corresponding to the boundary between "releasable" and "non-releasable";

FIG. 20 is a view showing the procedure of the experiment performed to find out the "relationship between Rc and t" corresponding to the boundary between "the state in which the mold release force can be adjusted by changing the thickness of the film" and "the state in which the mold release force cannot be adjusted by changing the thickness of the film"

DETAILED DESCRIPTION OF THE INVENTION

A production process of a ceramic green sheet, and a production process of a ceramic green sheet laminate according to the embodiment of the present invention will be described with reference to the drawings.

Figure 1:
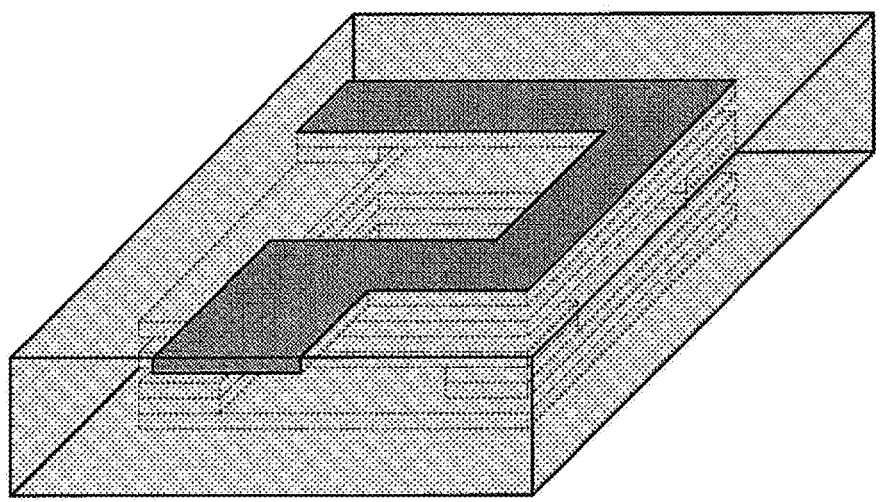
FIG. 1 is a perspective view showing an overall ceramic green sheet laminate according to an embodiment of the present invention.

FIG. 1 is a perspective view showing a whole ceramic green sheet laminate wherein plural (nine sheets in this example) ceramic green sheets according to the embodiment of the present invention are stacked and press-bonded. This laminate is small rectangular solid shaped and is several millimeters in square and height. The laminate has a body formed therein (see a dark dot portion). The body has a continuous spiral form and is made of a precursor of a conductor. When the ceramic sheet laminate (fired body) is formed by firing the ceramic green sheet laminate, the body (the precursor of the conductor) having the spiral form becomes a conductor having the same shape. The conductor having the spiral form can serve as a minute coil (inductor, laminate inductor), antenna, etc. Therefore, the ceramic sheet laminate (fired body) having the conductor incorporated therein or its processed goods can be used as an electronic component incorporated in a cellular phone or the like.

Figure 2:
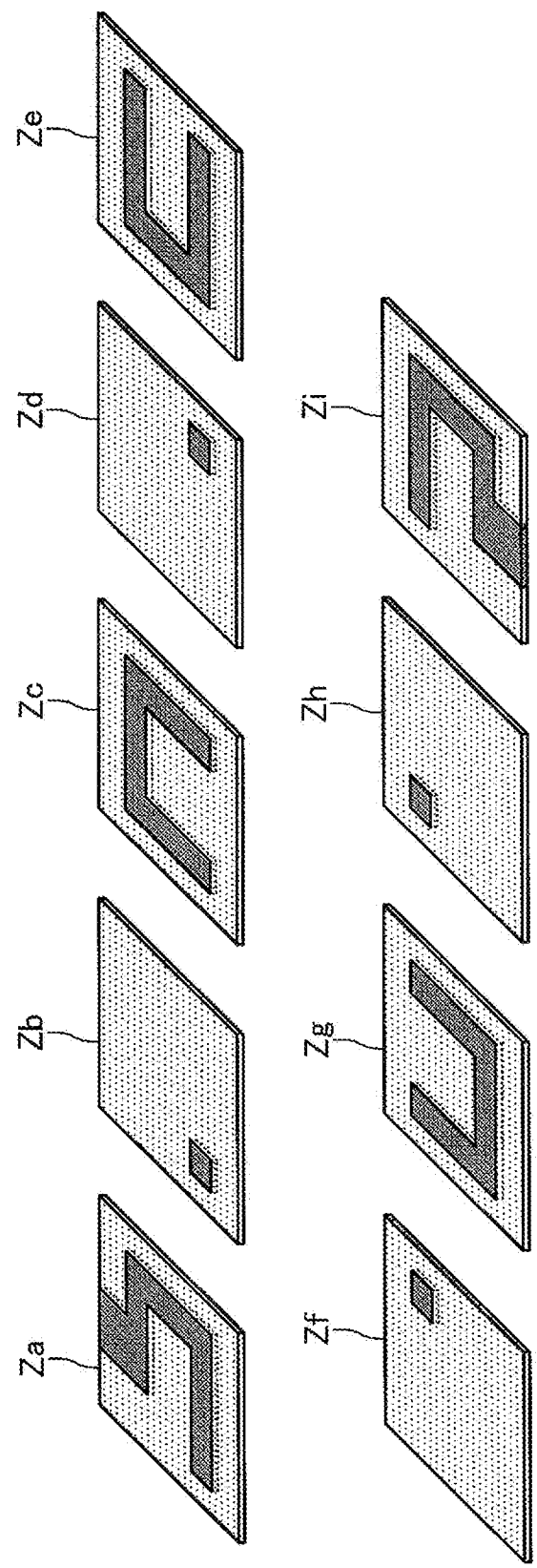
FIG. 2 is a plan view of ceramic green sheets used for producing the ceramic green sheet laminate shown in FIG. 1.

The ceramic green sheet shown in FIG. 1 is obtained by laminating and press-bonding nine flat-plate ceramic green sheets Za to Zi shown in FIG. 2 that is a plan view (top view), each having the same rectangular solid form, and having uniform thickness, in the order from Za. Each of the ceramic green sheets Za to Zi is obtained by forming and solidifying a ceramic slurry, containing a ceramic powder, dispersion medium, and gelling agent, into a flat-plate shape as described later. The ceramic green sheet may sometime be referred simply to a "sheet" hereinbelow.

Each of the sheets Za to Zi partially includes a body (shown as the dark dot portion) having a shape shown in FIG. 2 when viewed in a plane. Each of the bodies is made of a precursor of a conductor obtained by molding and solidifying a paste, which is made of a component different from the component of the ceramic slurry as described later. The sectional shape parallel to the sheet plane of each of the bodies is the same as the shape shown in FIG. 2 at any positions in the thickness direction of the sheet. Each of the bodies is exposed on a part of both surfaces (upper and lower surfaces) of the corresponding sheet with the same shape as the shape shown in FIG. 2.

The shapes of the bodies included in the sheets Za to Zi are designed such that, for all combinations of the adjacent two sheets, respective portions of the respective bodies that are exposed to the opposing side of an adjacent sheet are joined (brought into contact with) to each other, when the sheets Za to Zi are stacked in order from Za to Zi. As a result, when the sheets Za to Zi are stacked and press-bonded in order from Za to Zi, the body (precursor of the conductor) having the continuous spiral form, as shown in FIG. 1, is formed.

The production process of each sheet shown in FIG. 2 and the production process of the sheet laminate shown in FIG. 1 will be described below with reference to FIGS. 3 to 6. For the sake of convenience, FIGS. 3 to 6 show an example (the example in which one sheet laminate is produced) in which a sheet is produced one by one. However, in actuality, a plurality of sheets (e.g., 25 sheets) are simultaneously produced as shown in FIGS. 8 to 11 described later (accordingly, a plurality of sheet laminates are simultaneously formed). A first molding die A and a second molding die B used for forming a sheet Z# are respectively referred to as a first molding die A#, and a second molding die B# below for the sake of convenience. The symbol "#" indicates any one of "a" to "z" (the same is true below).

Figure 3:
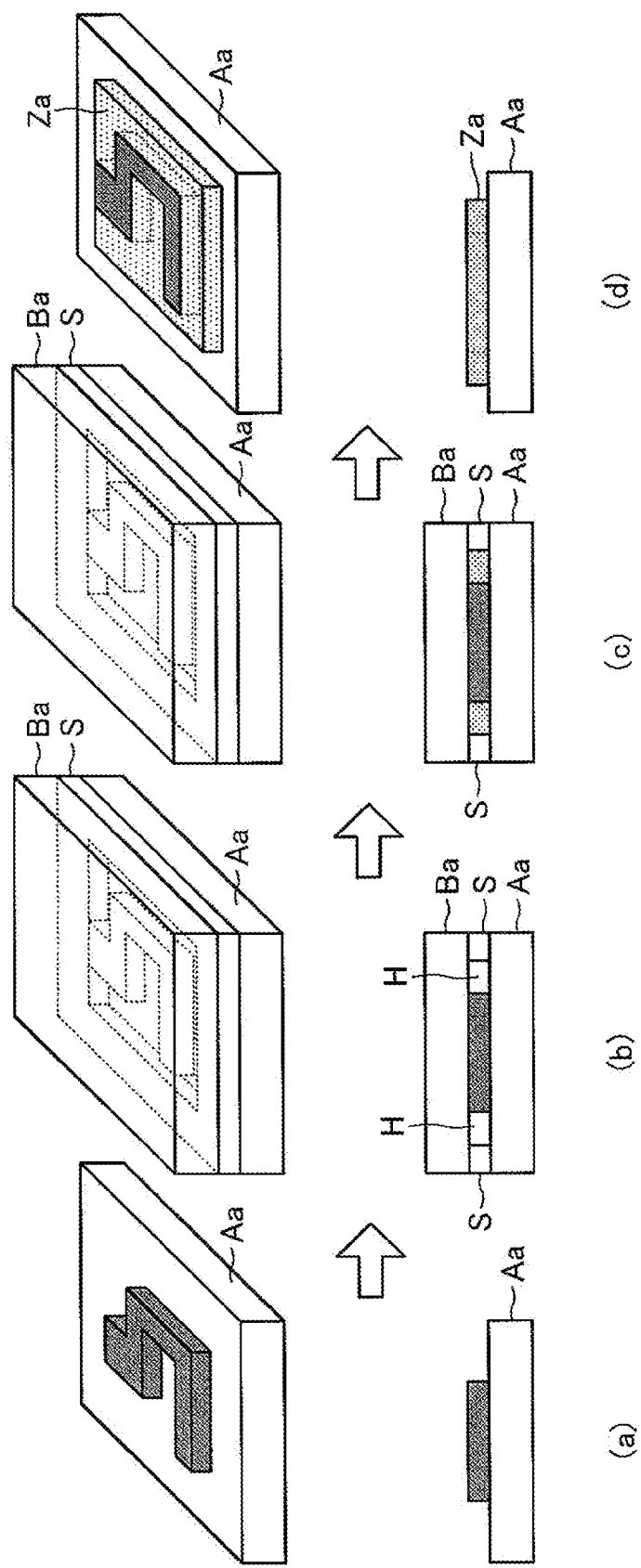
FIG. 3 illustrates a process for producing one of the ceramic green sheets shown in FIG. 2.

FIG. 3 shows the example in which the sheet Za (only one) is produced as one of the representatives of the sheets Za to Zi. Firstly, a first molding die Aa and a second molding die Ba, which have a rectangular solid shape and are made of a plate-like aluminum alloy (e.g., duralumin), are prepared. A mold release agent is applied to each of the molding surface (plane) of the first and the second molding dies Aa and Ba so as to form a non-adherent film thereon.

The film is formed so as to adjust force (stress) (hereinafter referred to as "mold release force (mold release stress)") in the thickness direction used for releasing the body molded on the molding surface from the molding surface. The greater the mold release force is, the more difficult it is to release the body from the molding surface. In the present embodiment, the mold release force involved with the first molding dies Aa to Az is adjusted to be greater than the mold release force involved with the second molding dies Ba to Bz. Additionally, the mold release force of the first molding die Aa of the first molding dies Aa to Az is adjusted to be greater than the mold release force involved with the remaining first molding dies Ab to Az. Further, the force in the thickness direction (hereinafter referred to as "sheet-to-sheet peeling force") required for peeling the stacked and press-bonded sheets is adjusted to be greater than the mold release force for the first molding die Aa.

Various films made of fluorine resin, silicon resin, fluorine oil, or silicon oil, or made by plating, CVD, PVD, or the like, can be used as the film. When fluorine resin, silicon resin, fluorine oil, or silicon oil is used for the film, the film is formed by a spraying method, dipping method, or the like. In this case, the mold release force can be adjusted according to the types of the resin, surface roughness of the film, or the thickness of the film.

When the film is formed by plating, fluorine resin, silicon resin, fluorine oil or silicon oil is preferably used. In this case, the mold release force is easy to be adjusted. When the film is formed by CVD or PVD, a gas containing fluorine atom may be used as a raw material. In this case, the mold release force is reduced so as to allow the mold release force to be easily adjusted. When the shape of the molding surface on which the film is formed is simple as in the present embodiment (plane in the present embodiment), a resinous bulk material (plate material) may be adhered onto the molding surface. Alternatively, the die may be made of a resinous bulk material.

Subsequently, a paste, which is to be a conductor afterward (hereinafter referred to as a "conductor paste"), is prepared. As shown in FIG. 3(a), the conductor paste is formed on the molding surface of the first body Aa, on which the film is formed so as to have the same shape as the shape of the body included in the sheet Za shown in FIG. 2 with the thickness same as (or slightly greater than) the thickness of the sheet Za according to a screen printing method or metal mask method.

The used conductive paste has conductive powders, resin component, and solvent, which are appropriately mixed. Examples of the conductive powders include metal powder such as silver powder, platinum powder. Examples of the resin component include resin such as phenolic resin, urethane resin, acrylic resin, butyral resin, ethyl cellulose, epoxy resin, theobromine resin, etc, or resin precursor. Examples of the solvent include organic solvent such as butyl carbitol acetate, butyl carbitol, diethyl hexanol, terpineol, etc. The molded conductor paste (body) is solidified through a predetermined process. For example, when the paste contains phenolic resin, it is solidified through the application of heat.

Next, as shown in FIG. 3(b), the second molding die Ba is formed on the molding surface of the first molding die Aa on which the body is formed via a spacer S having the thickness same as the thickness of the sheet Za. The second molding die Ba is placed with the molding surface on which the film is formed facing downward. Thus, the first and the second molding dies Aa and Ba are arranged in such a manner that the molding surface (plane) of the first molding die Aa on which the body is formed and the molding surface (plane) of the second molding die Ba (on which the body is not formed) oppose to each other so as to be parallel with each other with a gap same as the thickness of the sheet Za, and the top surface of the body (the plane having the shape same as the shape of the body included in the sheet Za shown in FIG. 2 viewed in a plane) is brought into contact with the molding surface of the second molding die Ba. The space H that is defined by the first and second molding dies Aa and Ba and the spacer S has the outline same as the outline of the sheet Za (rectangular solid).

Then, the ceramic slurry, which is to be a ceramic, is prepared. The prepared ceramic slurry is filled in the space H as shown in FIG. 3(c). Thus, the ceramic slurry is molded so as to have the outline same as the outline (rectangular solid) of the sheet Za.

The ceramic slurry contains a ceramic powder, dispersion medium, and gelling agent. The ceramic slurry also contains a dispersion aid or a catalyst as needed. The gelling agent solidifies the ceramic powder and allows the ceramic powder to be integral with the body, whereby the ceramic green sheet can be obtained. The gelling agent also serves as a binder for bonding the ceramic green sheets upon the stacking.

The used ceramic slurry contains 100 parts by weight of ferrite powder serving as the ceramic powder, 27 parts by weight of a mixture of aliphatic polyester and polybasic acid ester, 0.3 parts by weight of ethylene glycol serving as the dispersion medium, 3 parts by weight of polycarboxylic copolymer serving as the dispersion aid, 5.3 parts by weight of 4,4'-diphenyl methane diisocyanate serving as the gelling agent, and 0.05 parts by weight of 6-dimethylamino-1-hexanol serving as the catalyst. The molded ceramic slurry is solidified through the predetermined process. As a result, the sheet Za is obtained with the first and second molding dies Aa and Ba adhered onto both surfaces in the thickness direction.

Alumina, zirconia, silica, ferrite, barium titanate, silicon nitride, silicon carbide, etc. may be used as the ceramic powder. Organic solvent such as aliphatic polyester, polybasic acid ester, toluene, xylene, methyl ethyl ketone, etc. may be used as the dispersion medium. Phenolic resin, urethane resin, or acrylic resin, or a precursor thereof may be used as the gelling agent. An organic compound such as polycarboxylic copolymer, sorbitan ester, etc. may be used as the dispersion aid. An amine compound such as 6-dimethylamino-1-hexanol may be used as the catalyst.

Next, as shown in FIG. 3(d), only the second molding die Ba is removed from the sheet Za having the first and the second molding dies Aa and Ba adhered thereon. As described above, the mold release force involved with the first molding die Aa is adjusted so as to be greater than the mold release force involved with the second molding die Ba. Accordingly, when the tensile force is applied to the first and the second molding dies Aa and Ba in the direction in which the first and second molding dies Aa and Ba are apart from each other in the thickness direction (vertical direction), only the second molding die Ba can easily be removed. In this manner, the sheet Za having only the first molding die Aa adhered thereon is obtained as shown in FIG. 3(d).

Figure 4:
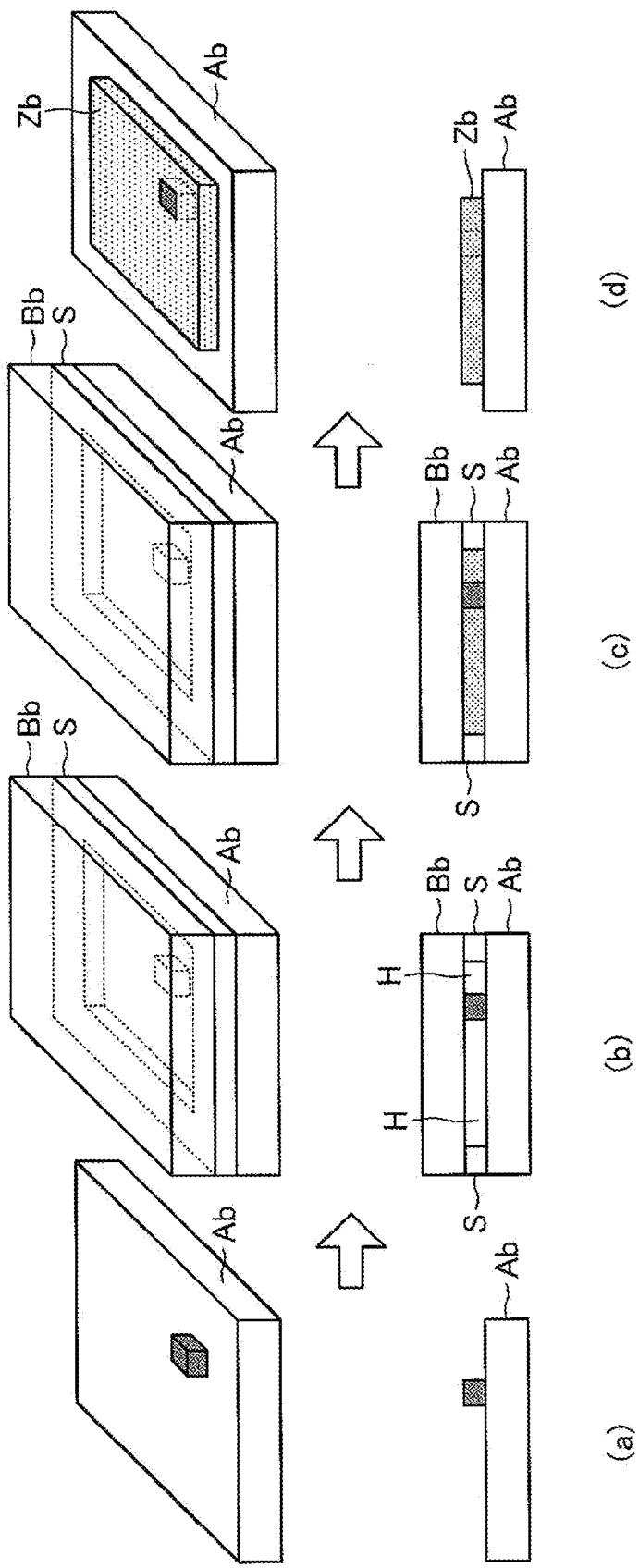
FIG. 4 illustrates a process for producing another one of the ceramic green sheets shown in FIG. 2.

FIG. 4 shows the example in which the sheet Zb (only one) is produced as the representative of the sheets Za to Zi. FIGS. 4(a) to 4(d) correspond to the above-mentioned FIGS. 3(a) to 3(d) respectively. The production process of the sheet Zb shown in FIGS. 4(a) to 4(d) is the same as the production process of the sheet Za shown in FIGS. 3(a) to 3(d) except that the conductor paste is molded on the molding surface of the first molding die Ab, on which the film is formed, in the shape same as the shape of the body included in the sheet Zb with the thickness equal to (or slightly greater than) the thickness of the sheet Zb. Therefore, the detail description of the production process shown in FIGS. 3(a) to 3(d) will not be repeated. In this manner, the sheet Zb having the first molding die Ab adhered thereon is obtained as shown in FIG. 4(d).

The sheets Zc to Zi can be obtained by the production process same as the production process of the sheets Za and Zb described above. In this manner, the sheet Z# (nine in total) (having only the first molding die A# adhered thereon) shown in FIG. 2 is obtained. The reason why the first molding die A# is not removed from the sheet Z# in this stage (before the lamination of the sheet) is to facilitate the removal of the sheet during the stacking of the sheet as described later.

Next, the process for obtaining the sheet laminate shown in FIG. 1 through the stacking and press-bonding of the sheet Z# will be described. Firstly, as shown in FIG. 5(a), the sheet Zb having the first molding die Ab adhered thereon shown in FIG. 4(d) is turned over, whereby the plane of the sheet Zb that is exposed due to the removal of the second molding die Bb is superimposed and press-bonded to the plane of the sheet Za that is exposed due to the removal of the second molding die Ba. As a result, the laminate (number of laminated layers is 2) of the sheets Za and Zb is obtained with the first molding dies Aa and Ab adhered onto both surfaces thereof in the thickness direction.

Then, as shown in FIG. 5(b), only the first molding die Ab is removed from the laminate of the sheets Za and Zb having the first molding dies Aa and Ab adhered thereon. In this case, the mold release force involved with the first molding die Aa is adjusted to be greater than the mold release force involved with the first molding die Ab, and the sheet-to-sheet peeling force is adjusted to be greater than the mold release force involved with the first molding die Aa. Therefore, when the tensile force is applied to the first and molding dies Aa and Ab in the direction in which the first molding dies Aa and Ab are apart from each other in the thickness direction (vertical direction), only the first molding die Ab can easily be removed. In this manner, the laminate of the sheets Za and Zb (number of laminated layers is 2) having only the first molding die Aa adhered thereon is obtained as shown in FIG. 5(b).

Next, the sheet Zc is stacked and press-bonded on the laminate of the sheets Za and Zb (number of laminated layers is 2) according to the procedure shown in FIGS. 5(a) and 5(b). As a result, the laminate of the sheets Za, Zb, and Zc (number of laminated layers is 3) having only the first molding die Aa adhered thereon is obtained. By repeating the procedure described above, the laminate of the sheets Za to Zi (number of laminated layers is 9) having only the first molding die Aa adhered thereon is obtained as shown in FIG. 6(a).

Then, as shown in FIG. 6(b), the first molding die Aa is removed from the laminate of the sheets Za to Zi (number of laminated layers is 9) having only the first molding die Aa adhered thereon. In this case, the sheet-to-sheet peeling force is adjusted to be greater than the mold release force involved with the first molding die Aa as described above. Therefore, when the tensile force is applied to the first molding die Aa in the direction in which the first molding die Aa is apart from the laminate of the sheets Za to Zi in the thickness direction (vertical direction), only the first molding die Aa can easily be removed. In this manner, the ceramic green sheet laminate of the sheets Za to Zi shown in FIG. 1 (number of laminated layers is 9) is obtained as shown in FIG. 6(b).

Figure 7:
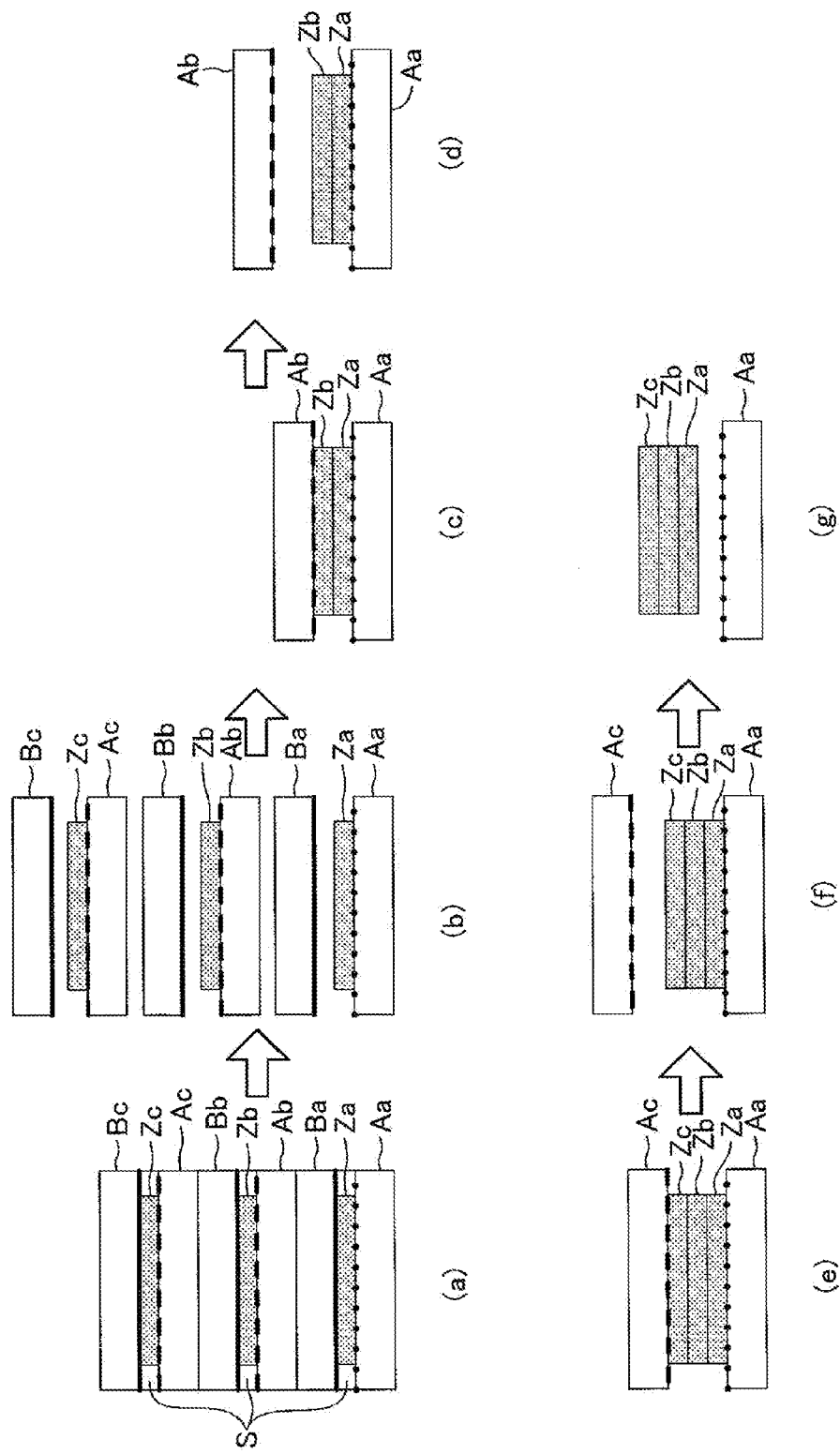
FIG. 7 shows that the order of the release of the first and second molding dies is appropriately controlled through the adjustment of a mold release force and a sheet-to-sheet peeling force.

FIG. 7 is a view for explaining the case in which the mold release force and the sheet-to-sheet peeling force are adjusted as described above so as to appropriately control the order of the mold release of the first and second molding dies A# and B#. In FIG. 7, among the segments corresponding to the molding surfaces of the molding die, the bolder segments indicate that the mold release force is small. For the sake of convenience, FIG. 7 illustrates the case in which the laminate made of three sheets Za, Zb, and Zc, which are representatives of nine sheets Za to Zi, is formed. The mark "*" indicates any one of "a" to "c" (the same is true below).

In FIG. 7(a), the sheet Z* is simultaneously formed with the first and the second molding dies A* and B* adhered on both surfaces thereof in the thickness direction. The state shown in FIG. 7(a) corresponds to the states shown in FIG. 3(c) and FIG. 4(c).

In FIG. 7(b), only the second molding die B* is removed from the sheet Z* having the first and the second molding dies A* and B* adhered thereon. The state shown in FIG. 7(b) corresponds to the states shown in FIG. 3(d) and FIG. 4(d). In this case, the mold release force involved with the first molding die A* is adjusted to be greater than the mold release force involved with the second molding die B* as described above. Therefore, when the tensile force is applied to the first and second molding dies A* and B* in the direction in which the first and second molding dies A* and B* are apart from each other in the thickness direction (vertical direction), only the second molding die B* can easily be removed.

In FIG. 7(c), the sheet Zb (see FIG. 7(b)) having the first molding die Ab adhered thereon is turned over, whereby the plane of the sheet Za that is exposed due to the removal of the second molding die Ba is superimposed and press-bonded to the plane of the sheet Zb that is exposed due to the removal of the second molding die Bb. As a result, the laminate (number of laminated layers is 2) of the sheets Za and Zb is obtained with the first molding dies Aa and Ab adhered onto both surfaces thereof in the thickness direction. The state shown in FIG. 7(c) corresponds to the state shown in FIG. 5(a).

In FIG. 7(d), only the first molding die Ab is removed from the laminate of the sheets Za and Zb having the first molding dies Aa and Ab adhered thereon. In this case, the mold release force involved with the first molding die Aa is adjusted to be greater than the mold release force involved with the first molding dies Ab and Ac, and the sheet-to-sheet peeling force is adjusted to be greater than the mold release force involved with the first molding die Aa. Therefore, when the tensile force is applied to the first and molding dies Aa and Ab in the direction in which the first molding dies Aa and Ab are apart from each other in the thickness direction (vertical direction), only the first molding die Ab can easily be removed.

In FIG. 7(e), the sheet Zc (see FIG. 7(b)) having the first molding die Ac adhered thereon is turned over, whereby the plane of the sheet Zc that is exposed due to the removal of the second molding die Bc is superimposed and press-bonded to the plane (i.e., the plane of the sheet Zb) of the laminate of the sheets Za and Zb, which is exposed due to the removal of the first molding die Ab. As a result, the laminate (number of laminated layers is 3) of the sheets Za, Zb, and Zc is obtained with the first molding dies Aa and Ac adhered onto both surfaces thereof in the thickness direction.

In FIG. 7(f), only the first molding die Ac is removed from the laminate of the sheets Za, Zb, and Zc having the first molding dies Aa and Ac adhered thereon. In this case, the mold release force involved with the first molding die Aa is adjusted to be greater than the mold release force involved with the first molding dies Ab and Ac, and the sheet-to-sheet peeling force is adjusted to be greater than the mold release force involved with the first molding die Aa as described above. Therefore, when the tensile force is applied to the first molding dies Aa and Ac in the direction in which the first molding dies Aa and Ac are apart from each other in the thickness direction (vertical direction), only the first molding die Ac can easily be removed.

Then, as shown in FIG. 7(g), the first molding die Aa is removed from the laminate of the sheets Za, Zb, and Zc (number of laminated layers is 3) having only the first molding die Aa adhered thereon. In this case, the sheet-to-sheet peeling force is adjusted to be greater than the mold release force involved with the first molding die Aa as described above. Therefore, when the tensile force is applied to the first molding die Aa in the direction in which the first molding die Aa is apart from the laminate of the sheets Za, Zb, and Zc in the thickness direction (vertical direction), only the first molding die Aa can easily be removed. In this manner, the ceramic green sheet laminate of the sheets Za, Zb, and Zc (number of laminated layers is 3) is formed.

As explained above, the order of the mold release of the molding dies A* and B* is appropriately controlled by adjusting the mold release force and sheet-to-sheet peeling force. As a result, the sheet Z* can be stacked one by one by holding the molding die, not by holding the sheet Z* itself. Consequently, the ceramic green sheet is easy to handle.

In the above description, the example in which the sheet is produced one by one (the example in which one sheet laminate is produced) has been described for the sake of convenience. In actuality, the plural sheets are simultaneously produced (accordingly, plural sheet laminates are simultaneously produced) as shown in FIGS. 8 to 11. FIGS. 8 to 11 illustrate the case in which the 25 sheets Za, 25 sheets Zb, and 25 sheets Zc, which are the representatives of nine sheets Za to Zi, are simultaneously formed, and 25 sheet laminates (number of laminated layers is 3) are simultaneously formed.

In FIG. 8(a), a mold release agent is applied to each of the molding surfaces of the first and second molding dies A* and B* used for molding the sheets Za, Zb, and Zc, whereby the film is formed on each of the molding surfaces. The mold release force is adjusted as described above.

In FIG. 8(b), the conductor paste is molded on the molding surface of the first molding die A* on which the film is formed in such a manner that 25 shapes each corresponding to the body included in the sheet Z* shown in FIG. 2 are aligned in a matrix of 5×5 with a predetermined space by means of a screen printing method. FIG. 8(b) corresponds to FIGS. 3(a) and 4(a).

In FIG. 8(c), the above-mentioned ceramic slurry is filled in the space H* that is defined by utilizing the first and second molding dies A* and B* and the spacer S (not shown in FIG. 8(c)). The outline of the space H* is the same as the outline (rectangular solid) of one big sheet ZZ* obtained when 25 sheets Z* are arranged without a gap on the same plane in a matrix of 5×5. Thus, the ceramic slurry is molded into three rectangular solids having the outline same as the shape of the outline (rectangular solid) of the sheet ZZ*. FIG. 8(c) corresponds to FIGS. 3(c) and 4(c).

Figure 9:
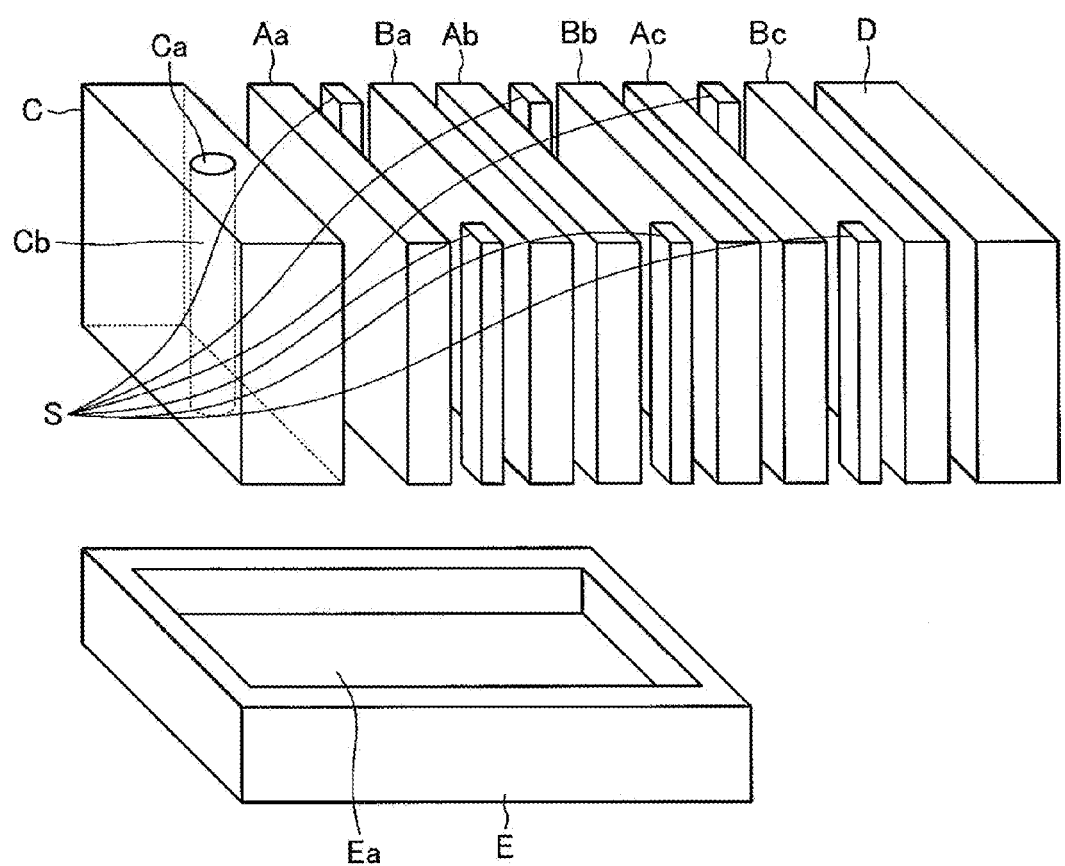
FIG. 9 is an exploded perspective view of a molding device used in the process shown in FIG. 8.
Figure 10:
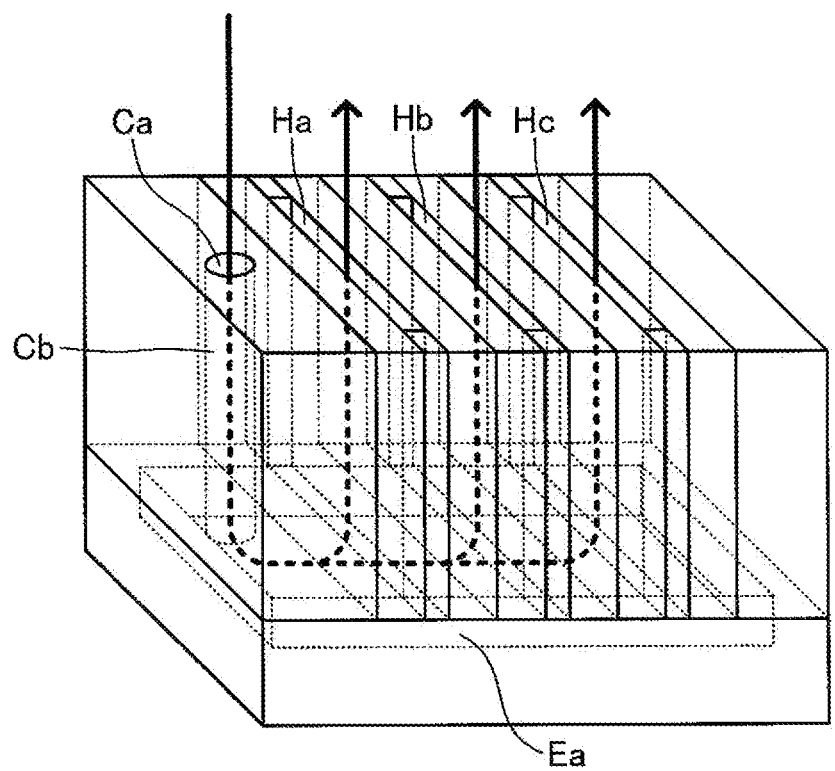
FIG. 10 is an assembly diagram showing the molding device used in the process shown in FIG. 8.

The process shown in FIG. 8(c) will be described below with reference to FIGS. 9 to 11. In the process shown in FIG. 8(c), a molding device shown in FIG. 9 that is an exploded perspective view and FIG. 10 that is an assembly view is used. As shown in FIGS. 9 and 10, in the molding device, a side wall member C formed with a slurry injection port Ca, a side wall member D, and a bottom wall member E formed with a slurry storage section Ea are used in addition to the first and second molding dies A* and B* and the spacer S.

In the condition in which the molding device is assembled as shown in FIG. 10, the first and the second molding dies A* and B* are arranged so as to stand in the vertical direction with spacers S in such a manner that the molding surface (plane) of the first molding die A* on which 25 bodies are formed and the molding surface (plane) of the second molding die B* (on which the body is not formed) oppose to each other so as to be parallel with each other with a gap same as the thickness of the sheet Z*, and the top surfaces of the 25 bodies are brought into contact with the molding surface of the second molding die B*. The space H* is defined by the first and second molding dies A* and B* and the spacer S in this state.

In order to fill the space H* with the ceramic slurry, the ceramic slurry is injected into the slurry injection port Ca as indicated by a bold arrow in FIG. 10. The injected ceramic slurry is filled in the space H* from the bottom to the top through the cylindrical slurry passage Cb extending downward from the injection port Ca formed in the side wall member C and the slurry storage section Ea.

In this case, after the predetermined amount of the ceramic slurry is injected from the injection port Ca as shown in FIG. 11(a), the liquid level of the ceramic slurry in the slurry passage Cb is pressed down by the application of pressure as shown in FIG. 11(b). Thus, the liquid level of the ceramic slurry in each space H* is pushed up, resulting in that the ceramic slurry is filled in the whole space H*.

In this case, be careful that the liquid level in the slurry passage Cb (accordingly, the liquid level in the slurry storage section Ea) during the application of pressure does not lower the lower end of the space H* (refer to a straight line L-L) as shown in FIG. 11(c). This is because air bubbles might enter the space H*.

In order to prevent the liquid level in the slurry passage Cb from lowering the lower end of the space H*, it is considered that more amount of the ceramic slurry injected from the injection port Ca is set. Alternatively, the molding device is tilted such that the slurry passage Cb moves upward as shown in FIG. 11(d).

Figure 5:
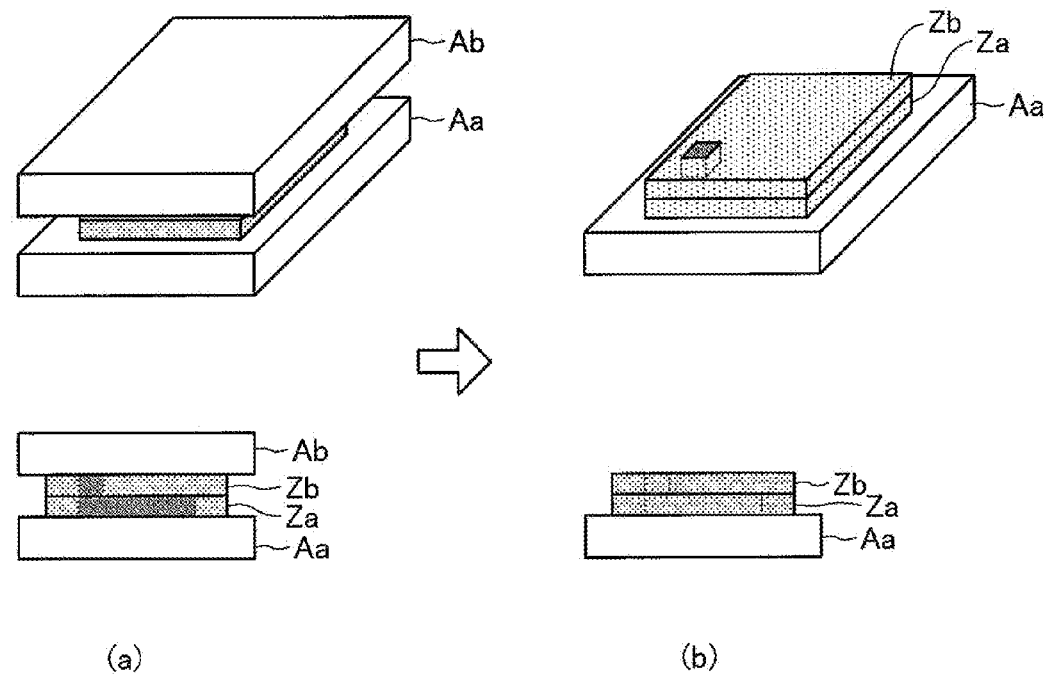
FIG. 5 shows a process for laminating the ceramic green sheets produced in the processes shown in FIGS. 3 and 4.
Figure 6:
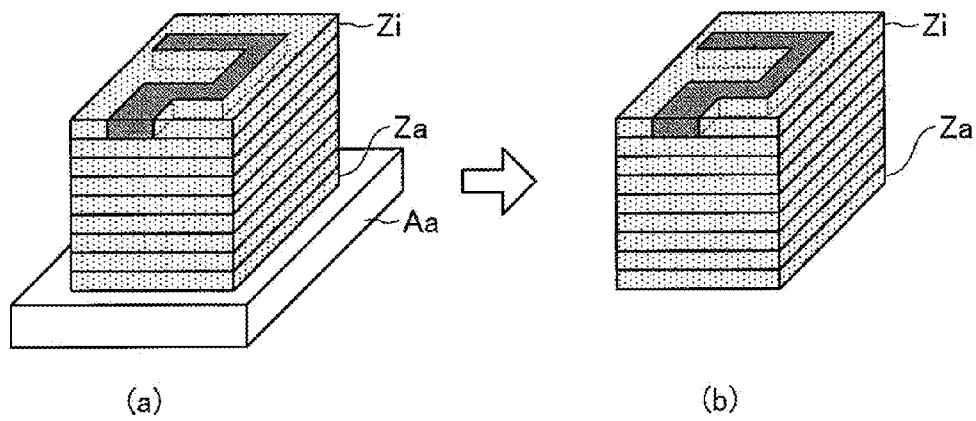
FIG. 6 shows a process for further laminating the other ceramic green sheets shown in FIG. 2 after the process shown in FIG. 5.
Figure 8:
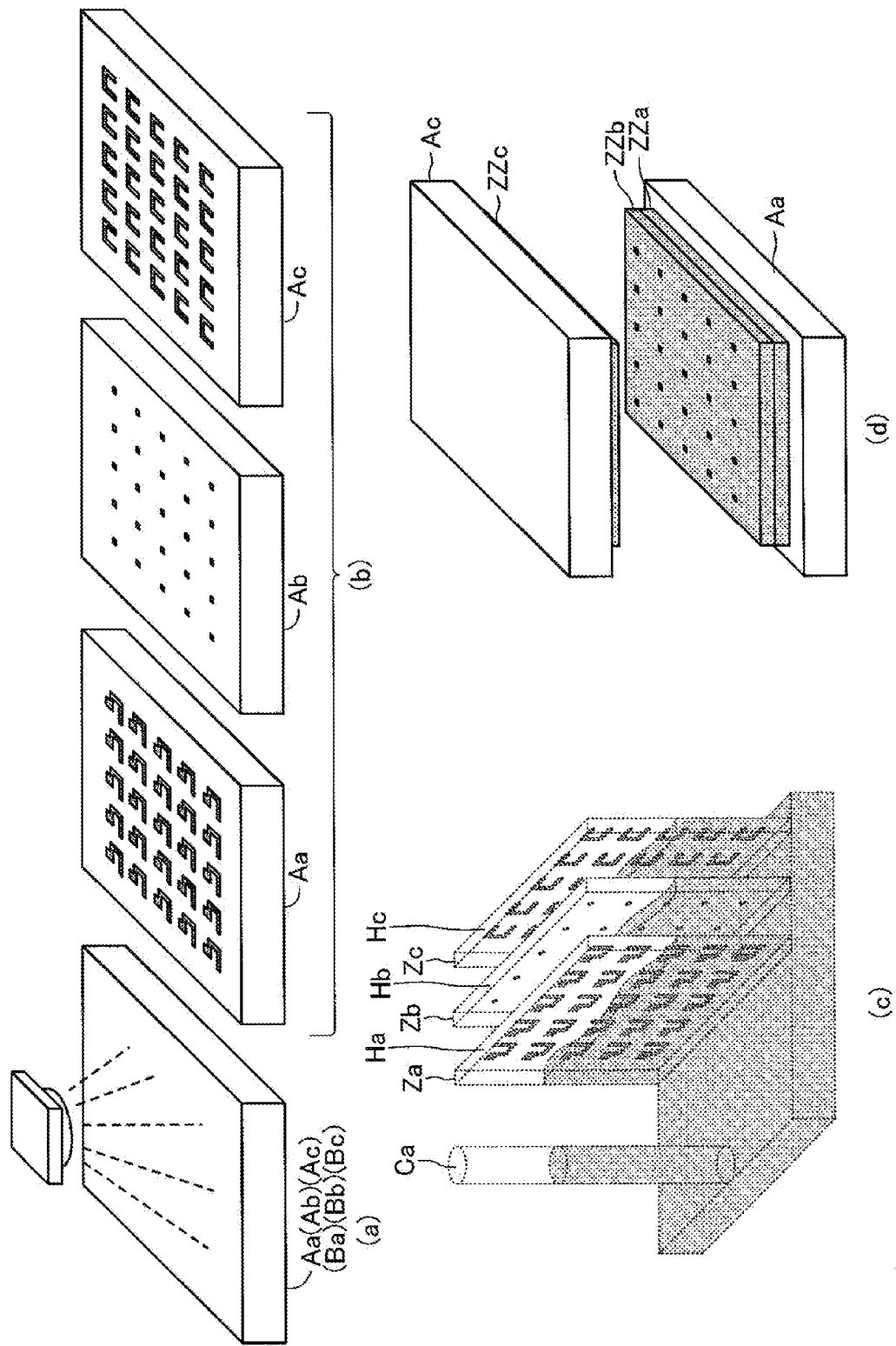
FIG. 8 shows a process for simultaneously producing plural ceramic green sheets shown in FIG. 1.

Referring again to FIG. 8, the sheet ZZb including 25 bodies and the sheet ZZc including 25 bodies are stacked and press-bonded one by one in FIG. 8(d) onto the sheet ZZa including 25 bodies according to the procedure similar to the procedure shown in FIGS. 5 and 6.

As a result, a ceramic green sheet laminate (number of laminated layers is 3) made of the sheets ZZa, ZZb, and ZZc is formed. This laminate is cut in a matrix of 5×5 in the direction perpendicular to the thickness direction, whereby the laminate is divided into 25 laminates (number of laminated layers is 3). Consequently, 25 laminates (number of laminated layers is 3) made of the sheets Za to Zc shown in FIG. 2 are simultaneously formed.

The process of forming the ceramic green sheet shown in FIG. 1 by stacking and press-bonding nine sheets Za to Zi shown in FIG. 2 from the order from Za has been described above. In the process, the ceramic slurry is molded in a flat-plate shape with the body formed only on the first molding die A# of the first and the second molding dies A# and B#. On the other hand, the ceramic slurry may be molded in a flat-plate shape with the body formed on both of the first and second molding dies A# and B#. One example of a process for forming the ceramic green laminate shown in FIG. 1 by employing this technique will be described below with reference to FIGS. 12 to 14.

FIGS. 12(a) to 12(d) correspond to FIGS. 3(a) to 3(d), and FIGS. 4(a) to 4(d). FIG. 12 shows the case in which a thick single sheet Zab (only one), which is obtained by superimposing the sheet Zb onto the sheet Za, is produced as one of the representatives of the sheets Za to Zi.

Firstly, as shown in FIG. 12(a), the conductor paste is molded on the molding surface of the first molding die Aa, on which the film is formed, so as to have the shape same as the shape of the body included in the sheet Za shown in FIG. 2 with the thickness same as (or slightly greater than) the thickness of the sheet Za according to a screen printing method. Further, the conductor paste is molded on the molding surface of the second molding die Ba, on which the film is formed, so as to have the shape same as the shape of the body included in the sheet Zb shown in FIG. 2 with the thickness same as (or slightly greater than) the thickness of the sheet Zb according to a screen printing method. The molded conductor paste (body) is solidified through a predetermined process.

Then, the second molding die Ba is placed on the molding surface of the first molding die Aa on which the body (first body) is formed via a spacer S having the thickness same as the sum of the thickness of the sheet Za and the thickness of the sheet Zb as shown in FIG. 12(b). The second molding die Ba is placed with the molding surface on which the body (second body) is formed facing downward. Thus, the first and the second molding dies Aa and Ba are arranged in such a manner that the molding surface (plane) of the first molding die Aa on which the first body Aa is formed and the molding surface (plane) of the second molding die Ba on which the second body (Ba) is formed oppose to each other so as to be parallel with each other with a gap same as the sum of the thickness of the sheet Za and the thickness of the sheet Zb, and the top surfaces of the first and second bodies are brought into contact with each other. The space H that is defined by the first and second molding dies Aa and Ba and the spacer S has the outline same as the outline of the sheet Zab (rectangular solid).

Then, the ceramic slurry is filled in the space H as shown in FIG. 12(c). Thus, the ceramic slurry is molded so as to have the outline same as the outline (rectangular solid) of the sheet Zab. The molded ceramic slurry is solidified through the predetermined process. As a result, the sheet Zab having the first and second molding dies Aa and Ba adhered on both ends in the thickness direction is formed.

Subsequently, as shown in FIG. 12(d), only the second molding die Ba is removed from the sheet Zab having the first and second molding dies Aa and Ba adhered thereon. In this manner, the sheet Zab having only the first molding die Aa adhered thereon is obtained as shown in FIG. 12(d).

Figure 12:
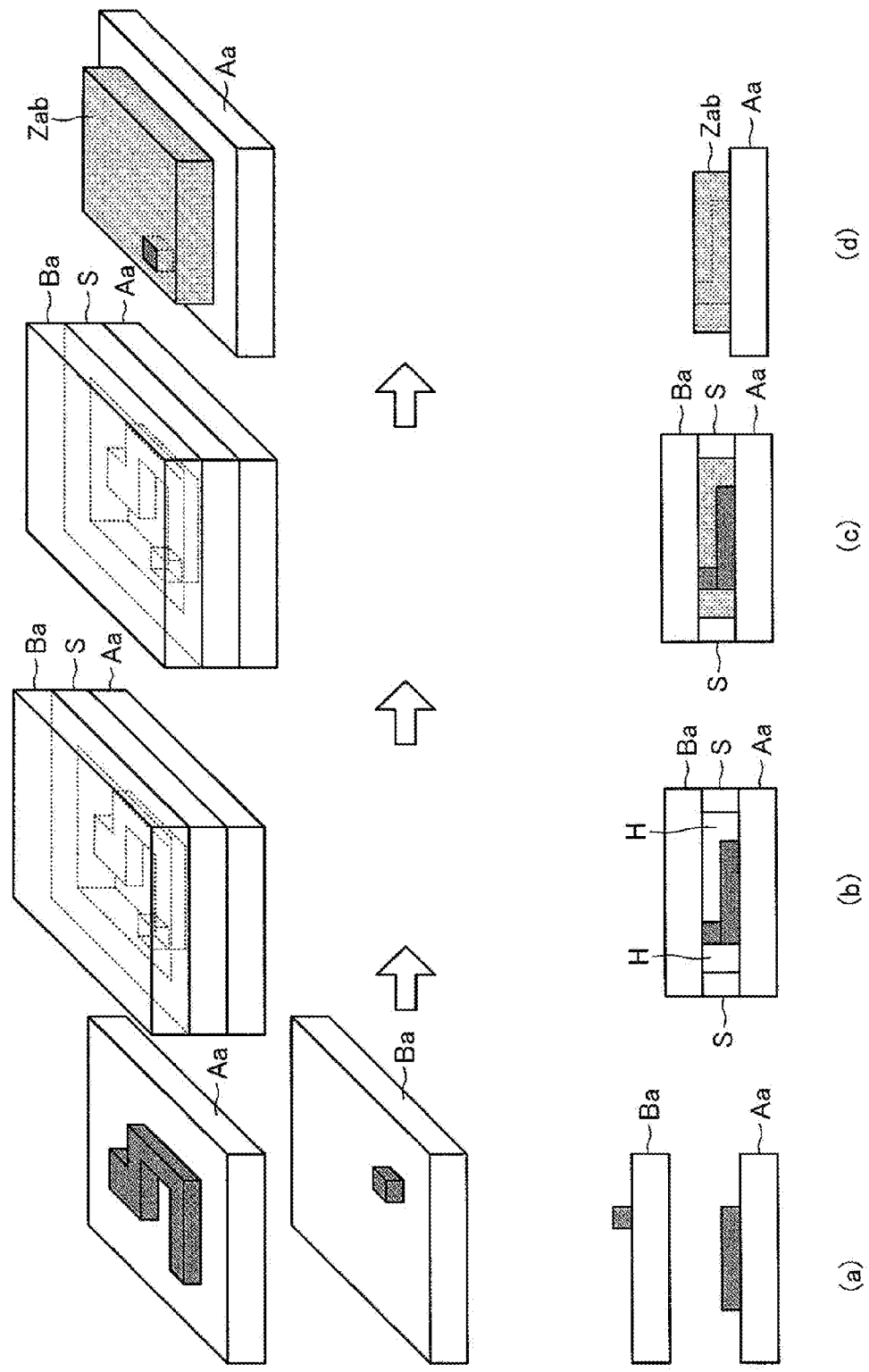
FIG. 12 shows a process for producing one sheet, which corresponds to a thick sheet obtained by superimposing two of the ceramic green sheets shown in FIG. 2.
Figure 13:
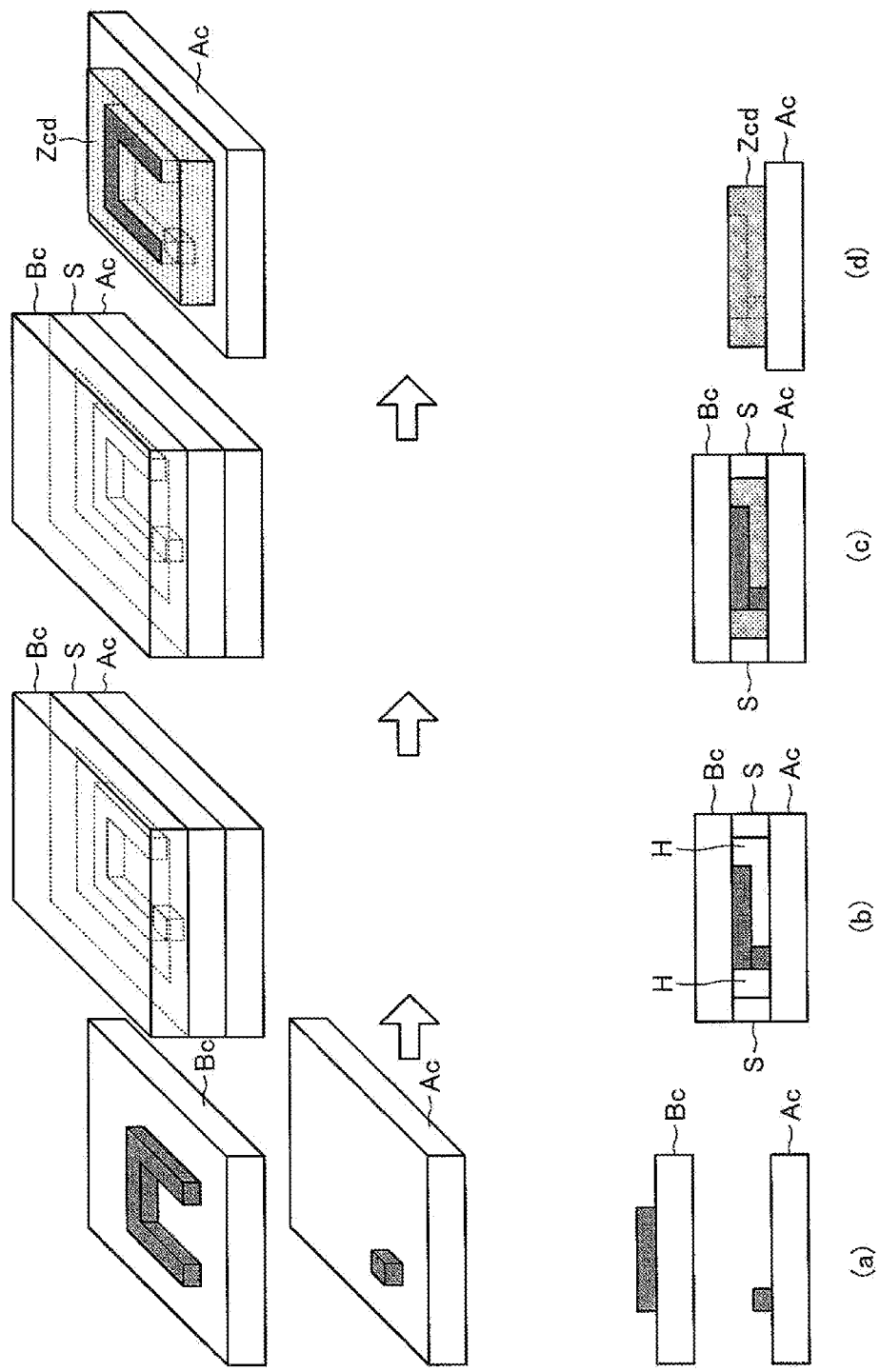
FIG. 13 shows a process for producing one sheet, which corresponds to a thick sheet obtained by superimposing another two of the ceramic green sheets shown in FIG. 2.
Figure 14:
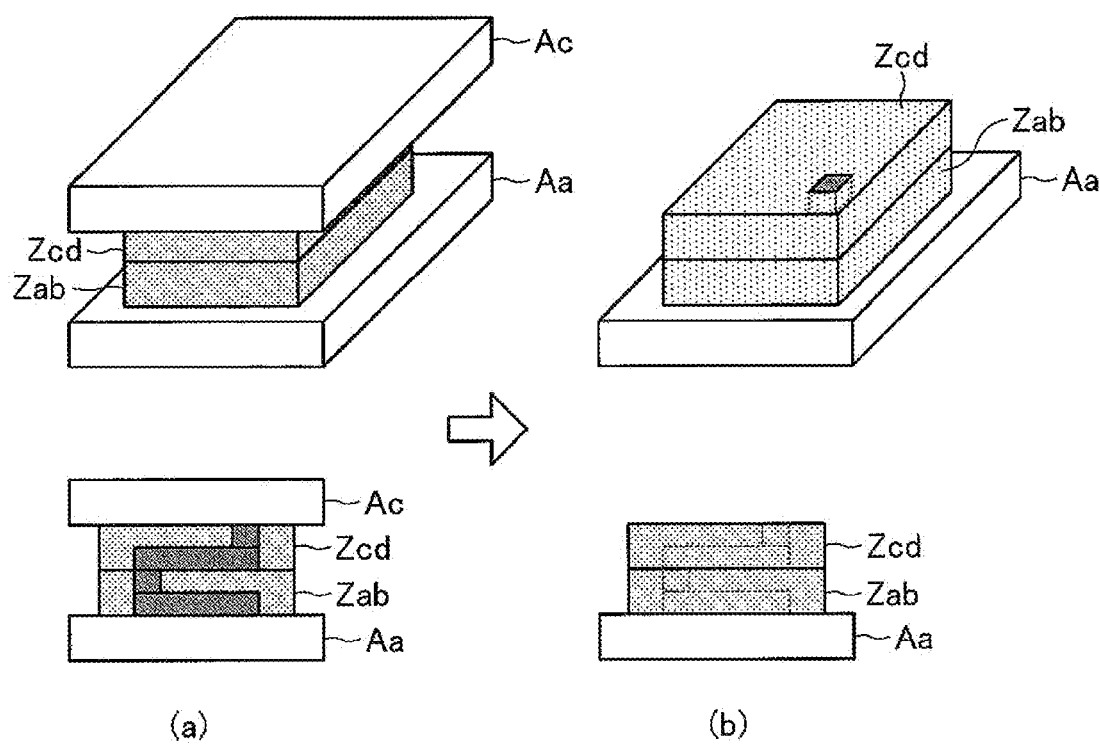
FIG. 14 shows a process for laminating the ceramic green sheets produced in the processes shown in FIGS. 12 and 13.

FIG. 13 shows the case in which a thick single sheet Zcd (only one), which is obtained by superimposing the sheet Zd onto the sheet Zc, is produced as one of the representatives of the sheets Za to Zi. FIGS. 13(a) to 13(d) correspond to FIGS. 12(a) to 12(d). The production process of the sheet Zcd shown in FIGS. 13(a) to 13(d) is the same as the production process of the sheet Zab shown in FIGS. 12(a) to 12(d) except that the conductor paste is formed on the molding surface of the first molding die Ac, on which the film is formed, so as to have the shape same as the shape of the body included in the sheet Zc shown in FIG. 2 with the thickness same as (or slightly greater than) the thickness of the sheet Zc, and the conductor paste is formed on the molding surface of the second molding die Bc, on which the film is formed, so as to have the shape same as the shape of the body included in the sheet Zd shown in FIG. 2 with the thickness same as (or slightly greater than) the thickness of the sheet Zd. Therefore, the detailed description of the production process of the sheet Zcd shown in FIGS. 13(a) to 13(d) will not be repeated. In this manner, the sheet Zcd having only the first molding die Ac adhered thereon is obtained as shown in FIG. 13(d).

One sheet Zef, which corresponds to a thick sheet obtained by superimposing the sheet Zf onto the sheet Ze, and one sheet Zgh, which corresponds to a thick sheet obtained by superimposing the sheet Zh onto the sheet Zg, can be formed by the production process same as that of the sheets Zab and Zcd.

Next, as shown in FIG. 14(a) corresponding to FIG. 5(a), the sheet Zcd having the first molding die Ac adhered thereon shown in FIG. 13(d) is turned over, whereby the plane of the sheet Zcd that is exposed due to the removal of the second molding die Bc is superimposed and press-bonded to the plane of the sheet Zab that is exposed due to the removal of the second molding die Ba. As a result, the laminate (number of laminated layers is 2) of the sheets Zab and Zcd is obtained with the first molding dies Aa and Ac adhered onto both ends in the thickness direction.

Then, as shown in FIG. 14(b) corresponding to FIG. 5(b), only the first molding die Ac is removed from the laminate of the sheets Zab and Zcd having the first molding dies Aa and Ac adhered thereon. In this manner, the laminate of the sheets Zab and Zcd (number of laminated layers is 2) having only the first molding die Aa adhered thereon is obtained as shown in FIG. 14(b).

Next, the sheets Zef, Zgh, and Zi are stacked and press-bonded on the laminate of the sheets Zab and Zcd (number of laminated layers is 2) according to the procedure shown in FIGS. 14(a) and 14(b). As a result, the laminate of the sheets Zab, Zcd, Zef, Zgh, and Zi (number of laminated layers is 5) having only the first molding die Aa adhered thereon is obtained.

Then, the first molding die Aa is removed from the laminate of the sheets Zab, Zcd, Zef, Zgh, and Zi (number of laminated layers is 5) having only the first molding die Aa adhered thereon. In this manner, even if the first and second bodies are formed on both of the molding surfaces of the first and second molding dies A# and B#, and the top surfaces of the first and second bodies are brought into contact with each other, the ceramic green sheet laminate (number of laminated layers is 5) substantially equal to the ceramic green sheet laminate (number of laminated layers is 9) of the sheets Za to Zi shown in FIG. 1 is obtained.

The case in which the molding surfaces of the first and second molding dies are entirely plane without having irregularities has been described above. In this case, the portion exposed on the surface of the sheet in the body (the precursor of the conductor) is molded in a plane shape that is continuous with the sheet plane without having irregularities. When the portions of the bodies (precursor of the conductor), which are included in the two adjacent sheets and exposed to the side opposite to the other sheet, are bonded to each other, like the sheets Zab and Zcd shown in FIG. 14, the continuity of the shape of the body might be imperfect.

Figure 15:
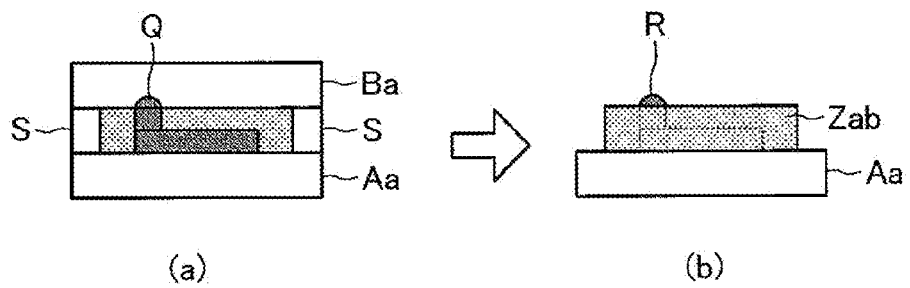
FIG. 15 is a view, corresponding to FIGS. 12(*a*) and (*b*), showing the case in which a concave portion is formed on the portion, corresponding to the body, of the molding surface of the second molding die having the body formed thereon.
Figure 16:
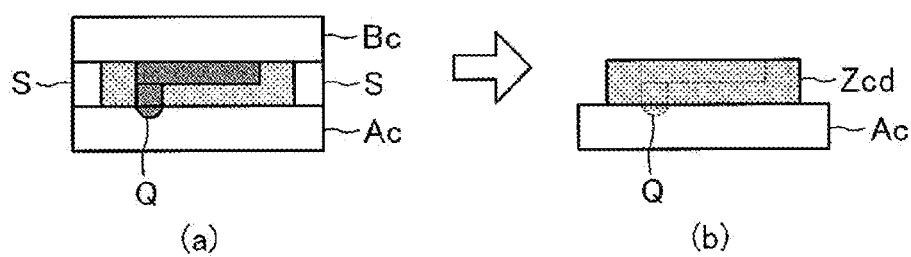
FIG. 16 is a view, corresponding to FIGS. 13(*a*) and (*b*), showing the case in which a concave portion is formed on the portion, corresponding to the body, of the molding surface of the first molding die having the body formed thereon.

On the other hand, when a concave portion Q is formed at the portion, corresponding to the body, on the molding surface, on which the body (precursor of the conductor) is formed, of the first and second molding dies Ac and Ba (or either one of the first and second molding dies) as shown in FIGS. 15(a) and 15(b) corresponding to FIGS. 12(a) and 12(b) and FIGS. 16(a) and 16(b) corresponding to FIGS. 13 (c) and 13(d), the portion of the body corresponding to the concave portion Q is molded into a convex shape R that projects from the plane of the sheet.

Figure 17:
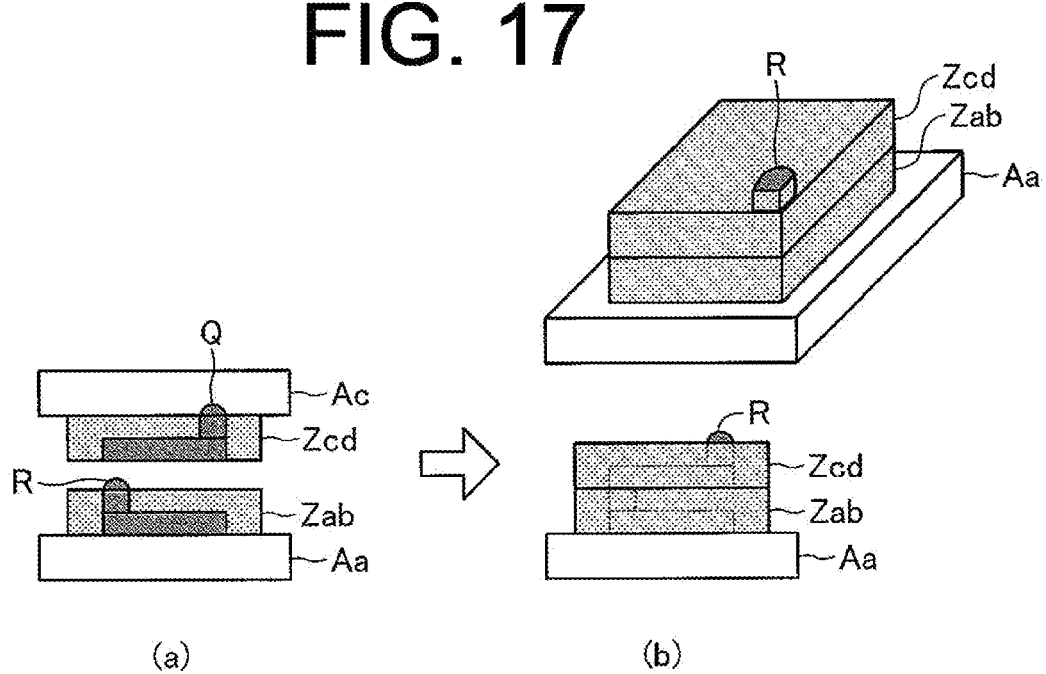
FIG. 17 shows the process for laminating the ceramic green sheets produced in the processes shown in FIGS. 15 and 16.

As shown in FIGS. 17(a) and 17(b) corresponding to FIGS. 14(a) and 14(b), the convex shape R is pressed and crushed by the portion of the plane of the adjacent sheet Zcd where the body is exposed, when the plane of the sheet Zab including the convex portion R and the plane of the adjacent sheet Zcd are press-bonded.

Thus, the bodies included in the adjacent two sheets can more surely be bonded. Consequently, the continuity of the shape of the body becomes more accurate. For example, when the body is a precursor of the conductor as described above, the electric conductivity of the conductor after the firing can surely be secured.

Figure 18:
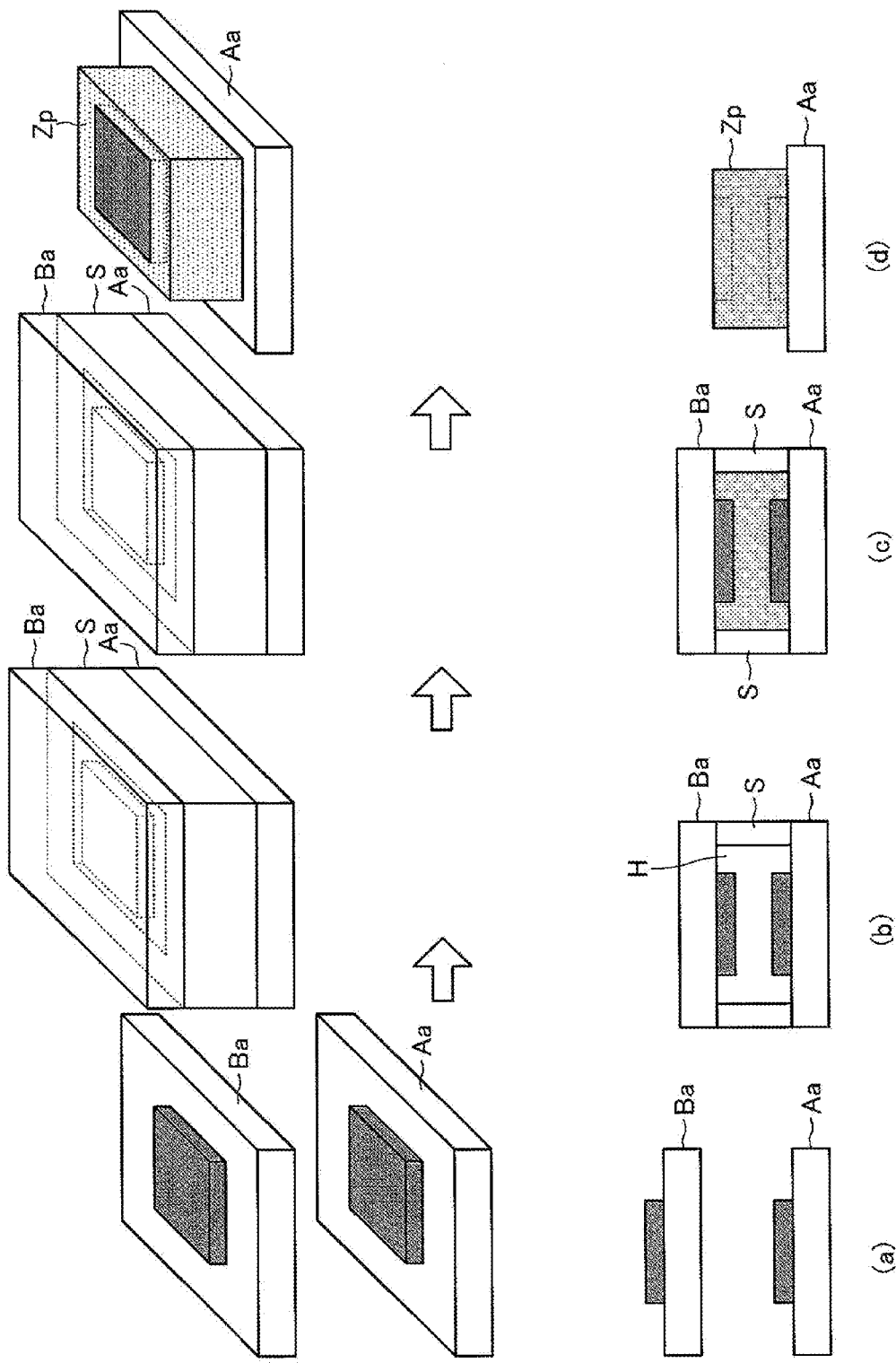
FIG. 18 is a view, corresponding to FIG. 12, showing the case in which the ceramic slurry is molded into a thin flat plate with the state where the first and second bodies are respectively formed on both of the molding surfaces of the first and second molding dies, and the top surfaces of the first and second bodies are spaced apart from each other with a predetermined distance.

FIGS. 12 and 13 show the case in which the ceramic slurry is molded into a flat-plate shape in a state where the first and second bodies are formed on both of the molding surfaces of the first and second molding dies A# and B#, and the top surfaces of the first and second bodies are brought into contact with each other. However, as shown in FIG. 18 corresponding to FIGS. 12 and 13, the ceramic slurry may be molded into a flat-plate shape in a state in which the first and second bodies are formed on both of the molding surfaces of the first and second molding dies A# and B#, and the top surfaces of the first and second bodies are apart from each other with a predetermined distance.

In this case, as shown in FIG. 18(b), the second molding die Ba is placed onto the molding surface of the first molding die Aa, on which the first body (precursor of the conductor) is formed, via a spacer S having the height greater than the sum of the thickness of the first body and the thickness of the second body. The second molding die Ba is placed with the molding surface, on which the second body (precursor of the conductor) is formed, facing downward. Thus, the first and second molding dies Aa and Ba are arranged such that the molding surface (plane) of the first molding die Aa, on which the body is formed, and the molding surface (plane) of the second molding die Bb, on which the body is formed, oppose to each other so as to be parallel with each other, and the top surfaces of the bodies are apart from each other. The space H defined by the first and second molding dies Aa and Ba and the spacer S has the outline same as the outline of the sheet Zp (rectangular solid).

Then, the ceramic slurry is filled in the space H as shown in FIG. 18(c). Thus, the ceramic slurry is molded so as to have the outline same as the outline (rectangular solid) of the sheet Zp. The molded ceramic slurry is solidified through the predetermined process. As a result, the sheet Zp having the first and second molding dies Aa and Ba adhered on both ends in the thickness direction is formed.

Subsequently, as shown in FIG. 18(d), only the second molding die Ba is removed from the sheet Zp having the first and second molding dies Aa and Ba adhered thereon. In this manner, the sheet Zp having only the first molding die Aa adhered thereon is obtained as shown in FIG. 18(d). Thereafter, the first molding die Aa is removed from the sheet Zp. The first molding die Aa can be removed by executing the following processes to the bonded portion of the sheet Zp and the first molding die Aa. Specifically, the processes include, for example, melting the mold release agent, inserting a spatula-like tool into the bonded portion, or blowing air.

When the sheet Zp is fired to form the ceramic sheet (fired body), the body (precursor of the conductor) becomes the conductor of the same shape. Specifically, a condenser having a ceramic interposed between the conductors, which are arranged apart from each other with a predetermined distance, can be formed. Accordingly, the ceramic sheet (fired body) having this condenser incorporated therein or its processed product can be used as an electronic component incorporated in a cellular phone or the like.

The case in which the body is made of the precursor of the conductor (conductor paste), which becomes the conductor when the ceramic sheet is formed by firing the ceramic green sheet, has been described above. On the other hand, the body may be made of a component that is removed through the volatilization when the ceramic sheet is formed by firing the ceramic green sheet.

In this case, the paste obtained by mixing resin component such as phenolic resin, urethane resin, acrylic resin, butyral resin, theobromine, ethyl cellulose, epoxy resin, etc, or precursor of these resins can be used as the paste used for molding the body. When the ceramic sheet is formed through the firing of the laminate in the case of the ceramic green sheet laminate shown in FIG. 1, for example, a space (cavity) having a continuous spiral form can be obtained.

The body may be made of a precursor of the ceramic that becomes the ceramic when the ceramic sheet is formed through the firing of the ceramic green sheet. In this case, the paste obtained by mixing resin component such as phenolic resin, urethane resin, acrylic resin, butyral resin, theobromine, ethyl cellulose, epoxy resin, etc, or precursor of these resins and a ceramic powder such as alumina, zirconia, silica, ferrite, barium titanate, silicon nitride, silicon carbide, etc. can be used as the paste used for molding the body. Accordingly, when the ceramic sheet is formed through the firing, a structure having a pattern formed by the ceramic of different type incorporated therein can be formed in the ceramic sheet.

It is added below about the adjustment in the magnitude relation of the mold release force involved with the first molding die and the mold release force involved with the second molding die. This adjustment is performed for appropriately controlling the order of the mold release as explained with reference to FIG. 7.

The magnitude relation between the mold release force involved with the first molding die and the mold release force involved with the second molding die can be adjusted by making different the type of the film formed through the application of the mold release agent or surface treatment (coating) to the molding surfaces of the first and second molding dies. For example, when fluorine resin and wax are used as the mold release agent, and a fluorine-containing nickel plating is employed as the surface treatment, the relationship of (mold release force in the case of the wax)>(mold release force in the case of the fluorine-containing nickel plating)>(mold release force in the case of the fluorine resin) is established at room temperature as described above.

When the type of the film formed on the molding surfaces of the first and second molding dies are made different, the magnitude relation between the mold release force involved with the first molding die and the mold release force involved with the second molding die can be adjusted (even if the thickness of the film is the same).

When the film is formed through the application of the mold release agent, the magnitude relation between the mold release force involved with the first molding die and the mold release force involved with the second molding die can also be adjusted by making the method of applying the mold release agent different. Examples of the method of applying the mold release agent include a spraying method and dipping method. These methods are compared below. The "base exposed portion" is the portion where the surface of the base of the molding die is exposed on the plane of the molding die on which the film is formed as described above.

In general, in the case of the dipping method, a very thin film having relatively uniform thickness is formed. On the other hand, in the case of the spraying method, the thickness of the film is non-uniform compared to the dipping method. Specifically, the state of the film formed by applying the mold release agent with the spraying method is relatively sensitive to the concentration of the mold release agent, opening degree of a valve portion for adjusting the discharge rate (flow rate of the discharged spray), temperature of the molding die, etc.

More specifically, when the solution of the applied mold release agent is difficult to be dried, such as when the temperature of the molding die is low or when the amount of the discharge liquid is great, the flow (dripping) or aggregation of the solution of the mold release agent is generated. Accordingly, the irregularities are easy to generate on the surface of the formed film. On the contrary, when the solution of the applied mold release agent is easy to be dried, such as when the temperature of the molding die is high or when the amount of the discharge liquid is small, the solvent is volatilized before the level of the solution of the mold release agent is leveled (smoothed). Therefore, the irregularities are also easy to generate on the surface of the formed film. Anyway, the irregularities are easy to generate on the surface of the film, and hence, the thickness of the film is non-uniform in the case of the spraying method, compared to the dipping method. This means that the surface area of the film is increased in the spraying method compared to the dipping method. By virtue of this, the mold release force is increased more in the spraying method than in the dipping method.

Additionally, since the ultrathin film having relatively a uniform thickness can be formed in the dipping method as described above, the "base exposed portion" can be formed on only a great number of microscopic protrusion portions on the plane that correspond to the surface roughness of the plane (molding surface) of the molding die. In other words, only a great number of microscopic "base exposed portions" are dispersed, while relatively large "base exposed portions" are difficult to be formed. On the other hand, the thickness of the film becomes non-uniform in the spraying method as described above. Therefore, when the ultrathin film is formed, the relatively large "base exposed portions" are likely to be formed, compared to the dipping method. Specifically, the total area of the "base exposed portions" is likely to be increased. This causes the mold release force to increase more in the spraying method than in the dipping method. When the area of the individual base exposed portion is too great, the mold release force becomes excessive. As a result, the ceramic sheet is broken (the ceramic sheet is non-releasable) when the ceramic green sheet is released from the molding die.

As described above, the method of applying the mold release agent in order to form the film is made different, whereby the magnitude relation between the mold release force involved with the first molding die and the mold release force involved with the second molding die can be adjusted (even if the type of the film and the average thickness are the same). The variation range of the thickness of the film formed by the spraying method is about several micrometers. Therefore, it can be said that the film formed by the spraying method satisfactorily meets the property required as the molding surface of the ceramic green sheet.

The magnitude relation between the mold release force involved with the first molding die and the mold release force involved with the second molding die can be adjusted by making the thickness of the film different, when the film is applied through the application of the mold release agent. When the thickness of the film is adjusted, the dipping method is preferable as the method of applying the mold release agent. This is based upon the operation in which the ultrathin film having relatively uniform thickness can be formed by the dipping method, and the thickness of the film is easily adjusted, as described above. The thickness of the film can be adjusted by adjusting the concentration of the mold release agent, the speed (hereinafter referred to as "lifting speed") when the molding die is lifted after the molding die is dipped in the solution of the mold release agent, the temperature of the molding die, the temperature of the solution of the mold release agent, and the temperature of the environment.

The relationship between the concentration of the mold release agent and the thickness of the film will be described later.

When the ultrathin film is formed by the dipping method, the area of the above-mentioned respective "base exposed portions" formed on "a great number of microscopic protrusion portions formed on the molding surface corresponding to the surface roughness of the molding die" is more reduced, as the thickness of the film is increased. As a result, the total area of the "base exposed portions" is further reduced, so that the mold release force is more reduced.

Thus, the magnitude relation between the mold release force involved with the first molding die and the mold release force involved with the second molding die can be adjusted by making the thickness of the film formed through the application of the mold release agent different (even if the type of the film and the average thickness are the same).

The preferable range of the thickness of the film formed by the dipping method will be studied below. As mentioned above, the smaller the thickness of the film is, the larger the total area of the "base exposed portions" is (accordingly, the more the mold release force increases). Therefore, when the thickness of the film is too small, the total area of the "base exposed portions" becomes too large, so that the mold release force becomes excessive. Consequently, the ceramic green sheet might be broken (ceramic green sheet is non-releasable) when the ceramic green sheet is released from the molding die. On the contrary, when the thickness of the film is too great, the "base exposed portions" are disappeared. As a result, the total area of the "base exposed portions" cannot be adjusted. Specifically, even if the thickness of the film is changed, the mold release force becomes the minimum and constant, so that the mold release force cannot be adjusted.

On the other hand, when the relationship of "$0.05 \cdot Rc \leq t \leq 0.25 \cdot Rc$" is established in case where the surface roughness of the plane (surface of the base) of the second molding die is defined as Rc (μm) by the "average height (average height of irregularities" (JIS B0601:2001), and the thickness of the film is defined as t (μm), it has been found that the ceramic green sheet can be released from the molding die without damaging the ceramic green sheet (the ceramic green sheet is releasable), and the mold release force can be adjusted by changing the thickness of the film. The experiment conducted by verifying this result will be described below.

FIG. 19 shows the procedure of the experiment for finding the "relationship between Rc and t" corresponding to the boundary between "releasable" (the state in which the ceramic green sheet can be released from the molding die without damaging the ceramic green sheet) and "non-releasable" (the state in which the ceramic green sheet is damaged when the ceramic green sheet is released from the molding die).

As shown in FIG. 19(a), a flat plate At (that is made of an aluminum alloy like the molding die used in the above-mentioned embodiment) having the top surface serving as the molding surface is firstly prepared. The flat plate At has a rectangular solid form, in which the plane shape is a 50-mm-square and the thickness is 20 mm. The surface roughness of the base surface of the molding surface is Rc (μm) by the "average height" (JIS B0601:2001). A film (thickness: t (μm)) made of a fluorine resin serving as a mold release agent is formed onto the molding surface with the dipping method.

Next, as shown in FIG. 19(b), the side face of the flat plate At is enclosed by an adhesive tape T, which has a width greater than the thickness of the flat plate At, in such a manner that the adhesive tape stands around the molding surface.

Then, as shown in FIG. 19(c), a ceramic slurry (the same as the one used in the above-mentioned embodiment) is injected onto the molding surface of the flat plate At enclosed by the adhesive tape T so as to have a predetermined thickness, and then, the slurry is molded and solidified into a thin plate form (rectangular solid form). Thus, the thin-plate ceramic green sheet Zt is formed.

Next, as shown in FIG. 19(d), the adhesive tape T is gently peeled. Then, as shown in FIG. 19(e), external force is applied to the ceramic green sheet Zt in the thickness direction (refer to the direction shown by an arrow) with the flat plate At being fixed in order to release the ceramic green sheet Zt from the flat plate At. In this case, it is determined that the ceramic green sheet is "releasable" or "non-releasable". This determination is done by visually confirming whether the ceramic green sheet is damaged or not.

The procedure described above was repeatedly executed, while the "combination (standard) of Rc and t" is successively changed. Table 1 shows the result. The "releasable" state is represented by "O", and the "non-releasable state" is represented by "X".

TABLE 1

|  |  | Base surface of flat plate Rc μm | | |
| --- | --- | --- | --- | --- |
|  |  | 0.82 | 1.34 | 1.78 |
| Thickness of film of mold release agent t μm | 0.03 | x | x | x |
|  | 0.05 | o | x | x |
|  | 0.07 | o | o | x |
|  | 0.12 | o | o | o |
|  | 0.18 | o | o | o |
|  | 0.22 | o | o | o |
|  | 0.30 | o | o | o |
|  | 0.34 | o | o | o |
|  | 0.38 | o | o | o |
|  | 0.44 | o | o | o |
|  | 0.51 | o | o | o | o: releasable
x: non-releasable (body is damaged)

From Table 1, it can be concluded that the ceramic green sheet is "releasable" when the relationship of "$0.05 \cdot Rc \leq t$" is established, while the ceramic green sheet is "non-releasable" when the relationship of "$t < 0.05 \cdot Rc$" is established.

FIG. 20 shows the procedure of the experiment that is conducted to find out the "relationship between Rc and t" corresponding to the boundary between the "state in which the mold release force can be adjusted by changing the thickness of the film" (the state in which the area of the base exposed portion can be adjusted by changing the thickness of the film) and "state in which the mold release force cannot be adjusted by changing the thickness of the film" (the state in which the base exposed portion is eliminated, and hence, the area cannot be adjusted).

As shown in FIG. 20(a), two flat plates Ata and Atb (made of an aluminum alloy like the molding die used in the above-mentioned embodiment) are prepared. For example, each of the flat plates Ata and Atb has a rectangular solid form, in which the plane shape is a 50-mm-square and the thickness is 20 mm. The surface roughness of the base surface of each molding surface is Rc (μm) by the "average height" (JIS B0601:2001). A film (thickness: t (μm)) made of a fluorine resin serving as a mold release agent is formed onto each of the molding surfaces with the dipping method. When the thickness of the film on the flat plate Ata is defined as t (μm), the thickness of the film on the flat plate Atb is t+α (μm) (α>0). Specifically, the thickness of the film on the flat plate Ata is greater than the thickness of the film on the flat plate Atb. Accordingly, the mold release force involved with the flat plate Ata must be greater than the mold release force involved with the flat plate Atb.

The two flat plates Ata and Atb are held in such a manner that the respective molding surfaces oppose to each other in parallel with a predetermined space (e.g., 2 mm), and both side surfaces and lower surface around the space formed between the molding surfaces are sealed by means of tools F1, F2 and F3. A ceramic slurry (same as the one used in the above-mentioned embodiment) is injected and filled in the space from an opening formed on the top surface around the space. Then, the slurry is molded and solidified into a thin plate form (rectangular solid form). Thus, a ceramic green sheet Zt having a thin plate form is formed.

Subsequently, as shown in FIG. 20(b), the tools F1, F2 and F3 are gently removed, and then, external force is applied to the flat plates Ata and Atb in the thickness direction (refer to the direction shown by two arrows), whereby both plates are separated. When the ceramic green sheet Zt remain on the flat plate Ata as a result of the separation as shown in FIG. 20(c), this means that the mold release force involved with the flat plate Ata is greater than the mold release force involved with the flat plate Atb, accordingly, that the ceramic green sheet is in "the state in which the mold release force can be adjusted by changing the thickness of the film". On the other hand, when the ceramic green sheet Zt remain on the flat plate Atb, or when the ceramic green sheet Zt remain on neither flat plate (when the ceramic green sheet Zt falls by its own weight), this means that the ceramic green sheet is in "the state in which the mold release force cannot be adjusted by changing the thickness of the film".

The procedure described above is executed five times for one "combination (standard) of Rc and t". This execution is repeatedly performed as "combination (standard) of Rc and t" is changed. The number of times the ceramic green sheet Zt remains on the flat plate Ata is counted for each standard. Table 2 shows the result. In this experiment, it is determined that the ceramic green sheet is in "the state in which the mold release force can be adjusted by changing the thickness of the film" when the counted number is "4" or more, and in other cases, it is determined that the ceramic green sheet is in "the state in which the mold release force cannot be adjusted by changing the thickness of the film".

TABLE 2

| Thickness of film of mold release agent t μm | Flat plate Ata | Flat plate Atb | Base surface of flat plate Rc μm | | |
|---|---|---|---|---|---|
| | | | 0.82 | 1.34 | 1.78 |
| | 0.03 | - 0.05 | — | — | — |
| | 0.05 | - 0.07 | 5 | — | — |
| | 0.07 | - 0.12 | 5 | 5 | — |
| | 0.12 | - 0.18 | 5 | 5 | 5 |
| | 0.18 | - 0.22 | 5 | 5 | 5 |
| | 0.22 | - 0.30 | 1 | 5 | 5 |
| | 0.30 | - 0.34 | 0 | 5 | 5 |
| | 0.34 | - 0.38 | 1 | 1 | 5 |
| | 0.38 | - 0.44 | 0 | 1 | 5 |
| | 0.44 | - 0.51 | 0 | 0 | 4 |
| | 0.51 | - 0.65 | 0 | 0 | 1 |

From Table 2, it can be concluded that the ceramic green sheet is in "the state in which the mold release force can be adjusted by changing the thickness of the film" when the relationship of "t≤0.25·Rc" is established, while the ceramic green sheet is in "the state in which the mold release force cannot be adjusted by changing the thickness of the film" when the relationship of "0.25·Rc<t" is established.

From the above, it can be concluded that the ceramic green sheet can be released ("releasable") from the molding die without damaging the ceramic green sheet and the mold release force can be adjusted by changing the thickness of the film when the relationship of "0.05·Rc≤t≤0.25·Rc" is established between Rc and t.

Figure 21:
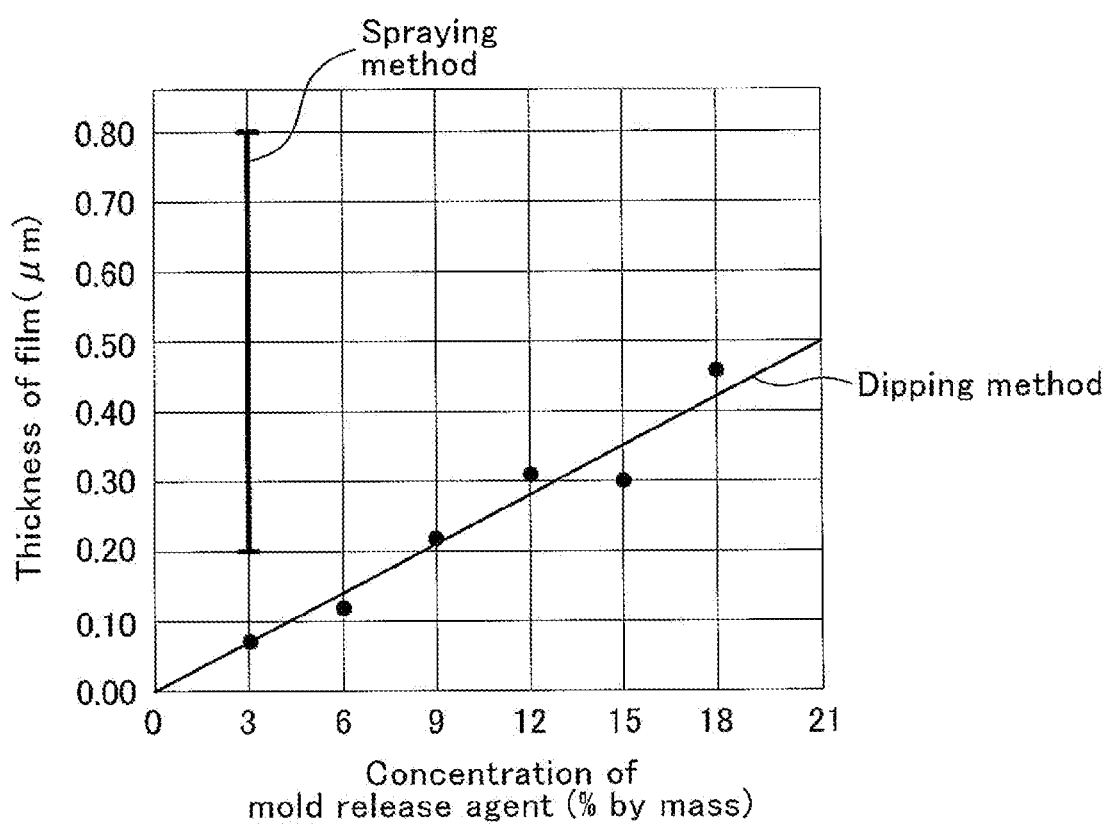
FIG. 21 is a graph showing the relationship between the concentration of the mold release agent and the thickness of the film.

The relationship between the concentration of the mold release agent and the thickness of the film will be described with reference to FIG. 21. FIG. 21 shows the result of the experiment for acquiring the relationship between the concentration (percent by mass) of the mold release agent and the thickness (μm) of the film when the dipping method is employed. In this experiment, the process for measuring the thickness of the film, which is made of the fluorine resin serving as the mold release agent and formed on the surface (plane) of a predetermined glass plate with the dipping method, at room temperature is repeatedly performed as the concentration of the mold release agent is successively changed. The lifting speed is fixed to 1.0 mm/sec.

As can be understood from FIG. 21, the concentration of the mold release agent is substantially proportional to the thickness of the film in the dipping method within the range of 3 to 18% of the concentration of the mold release agent. This means that the mold release force can be adjusted by changing the concentration of the mold release agent within the range of 3 to 18% of the concentration of the mold release agent. When the concentration of the mold release agent is 18(%), the mold release agent is precipitated in the solution of the mold release agent. Specifically, the upper limit of the concentration of the mold release agent is about 18(%).

In the dipping method, the thickness of the film is substantially uniform all over the film. On the other hand, the variation range of the thickness of the film is about 0.6 μm, and the minimum value of the thickness is 0.2 μm in the spraying method when the concentration of the mold release agent is 3(%), as can be understood from FIG. 21. Specifically, although the film formed with the spraying method has a great variation range compared to the film formed with the dipping method, the minimum value (=0.2 μm) of the thickness can be a sufficient value for realizing the "releasable" ceramic green sheet.

What is claimed:

1. A production method of a ceramic sheet, comprising:
    molding and solidifying a paste onto a single plane of a first molding die so as to form a body having a predetermined shape;
    arranging the first molding die and a second molding die, which has a plane, in such a manner that the single plane of the first molding die having the body formed thereon and the plane of the second molding die face each other in parallel with a gap, and a top surface of the body is brought into contact with the plane of the second molding die;
    filling a ceramic slurry, which contains a ceramic powder, an organic solvent as a dispersion medium, and a resin as a gelling agent, and which is made of a component different from the paste, into the space formed between the planes of the first and the second molding dies so as to mold the ceramic slurry into a flat plate;
    solidifying the molded ceramic slurry so as to form a ceramic green sheet having a flat plate shape with a uniform thickness and opposed major surfaces, in which the body having the predetermined shape is partially included and the body is exposed on a part of each of both opposed major surfaces of the ceramic green sheet; and firing the ceramic green sheet to volatilize the resin and form a ceramic sheet.

2. A production method of a ceramic sheet, comprising:

molding and solidifying a first paste onto a plane of a first molding die so as to form a first body having a first shape;

molding and solidifying a second paste onto a plane of a second molding die so as to form a second body having a second shape;

arranging the first molding die and the second molding die in such a manner that the plane of the first molding die having the first body formed thereon and the plane of the second molding die having the second body formed thereon face each other in parallel with a gap;

filling a ceramic slurry, which contains a ceramic powder, an organic solvent as a dispersion medium, and a resin as a gelling agent, and which is made of a component different from the first and the second pastes, into the space formed between the planes of the first and the second molding dies so as to mold the ceramic slurry into a flat plate;

solidifying the molded ceramic slurry so as to form a ceramic green sheet having a flat plate shape with a uniform thickness and opposed major surfaces, in which the first and the second bodies having the first and the second shapes are partially included and the first and the second bodies are respectively exposed on a part of one and the other of both opposed major surfaces of the ceramic green sheet; and firing the ceramic green sheet to volatilize the resin and form a ceramic sheet.

3. A production method of a ceramic sheet laminate in which two or more ceramic green sheets formed by the production method according to claim 1 are stacked in the thickness direction so as to form a ceramic green sheet laminate, comprising:

removing only the second molding die from each of the ceramic green sheets having the first and the second molding dies adhered thereon;

press-bonding the planes of two ceramic green sheets, which are exposed through the removal of the second molding die, so as to form a ceramic green sheet laminate made of the two ceramic green sheets;

removing only one of two first molding dies adhered onto both ends of the ceramic green sheet laminate in the thickness direction so as to form a ceramic green sheet laminate.

4. A production method of a ceramic sheet laminate according to claim 3, wherein the force in the thickness direction needed to separate the press-bonded ceramic green sheets is greater than the force in the thickness direction needed to separate the first molding die adhered onto the ceramic green sheet from the ceramic green sheet, and the force in the thickness direction needed to separate the first molding die adhered onto the ceramic green sheet from the ceramic green sheet is greater than the force in the thickness direction needed to separate the second molding die adhered onto the ceramic green sheet from the ceramic green sheet.

5. A production method of the ceramic sheet laminate according to claim 4, wherein a film is formed beforehand on the plane of each of the first and the second molding dies through the application of a mold release agent or surface treatment, before the body is formed on the plane of the first molding die or before the first and the second bodies are formed on the planes of the first and the second molding dies, and the magnitude relation between the force in the thickness direction needed to separate the first molding die from the ceramic green sheet and the force in the thickness direction needed to separate the second molding die from the ceramic green sheet is adjusted by making the types of the films different.

6. A production method of the ceramic sheet laminate according to claim 4, wherein a film is formed beforehand on the plane of each of the first and the second molding dies through the application of a mold release agent, before the body is formed on the plane of the first molding die or before the first and the second bodies are formed on the planes of the first and the second molding dies, and the magnitude relation between the force in the thickness direction needed to separate the first molding die from the ceramic green sheet and the force in the thickness direction needed to separate the second molding die from the ceramic green sheet is adjusted by making the methods of applying the mold release agent, which are done for forming the films, different.

7. A production method of the ceramic sheet laminate according to claim 4, wherein a film is formed beforehand on the plane of each of the first and the second molding dies through the application of a mold release agent, before the body is formed on the plane of the first molding die or before the first and the second bodies are formed on the planes of the first and the second molding dies, and the magnitude relation between the force in the thickness direction needed to separate the first molding die from the ceramic green sheet and the force in the thickness direction needed to separate the second molding die from the ceramic green sheet is adjusted by making the thickness of the films different.

8. A production method of a ceramic sheet laminate according to claim 7, wherein a relationship of $0.05 \cdot Rc \leq t \leq 0.25 \cdot Rc$ is established in case where the surface roughness of the plane of each of the first and the second molding dies is defined as $Rc$ by the average height, and the thickness of the film is defined as $t$.

9. A production method of a ceramic sheet laminate according to claim 7, wherein the mold release agent is applied by a dipping method.

10. A production method of a ceramic sheet laminate according to claim 3, wherein in one of or both of the first and the second molding dies, a concave portion is formed on the portion, corresponding to the body, of the plane on which the body is formed, and the portion, corresponding to the concave portion, of the body is molded into a convex shape projecting from the plane of the ceramic green sheet, and when the plane of the ceramic green sheet including the convex shape is press-bonded to the plane of the adjacent ceramic green sheet, the convex shape is pressed and crushed by the portion where the body included in the adjacent ceramic green sheet is exposed on the plane of the adjacent ceramic green sheet, by which the portions of the bodies that are contained in the respective adjacent two ceramic green sheets and exposed to the sides facing the respective adjacent ceramic green sheets are connected to each other.

11. A production method of a ceramic sheet laminate in which two or more ceramic green sheets formed by the production method according to claim 2 are stacked in the thickness direction so as to form a ceramic green sheet laminate, comprising:
  removing only the second molding die from each of the ceramic green sheets having the first and the second molding dies adhered thereon;
  press-bonding the planes of two ceramic green sheets, which are exposed through the removal of the second molding die, so as to form a ceramic green sheet laminate made of the two ceramic green sheets;
  removing only one of two first molding dies adhered onto both ends of the ceramic green sheet laminate in the thickness direction so as to form a ceramic green sheet laminate.

12. The production method of a ceramic sheet laminate of claim 3, wherein the process of forming a ceramic green sheet laminate is repeated more than once and further comprises:
  press-bonding the plane of the ceramic green sheet laminate, which is exposed through the removal of the first molding die, and the plane, which is exposed through the removal of the second molding die, of one of the remaining one or more ceramic green sheets, which have not yet been stacked, so as to form a new ceramic green sheet laminate in which the number of the laminated layers increases by 1; and removing only one of the two first molding dies adhered onto both ends of the new ceramic green sheet laminate in the thickness direction.

13. The production method of a ceramic sheet laminate of claim 11, wherein the process of forming a ceramic green sheet laminate is repeated more than once and further comprises:
  press-bonding the plane of the ceramic green sheet laminate, which is exposed through the removal of the first molding die, and the plane, which is exposed through the removal of the second molding die, of one of the remaining one or more ceramic green sheets, which have not yet been stacked, so as to form a new ceramic green sheet laminate in which the number of the laminated layers increases by 1; and removing only one of the two first molding dies adhered onto both ends of the new ceramic green sheet laminate in the thickness direction.

* * * * *